(12) United States Patent
Kim et al.

(10) Patent No.: US 10,936,140 B2
(45) Date of Patent: Mar. 2, 2021

(54) METHOD AND DEVICE FOR DISPLAYING RESPONSE

(71) Applicant: Samsung Electronics Co., Ltd., Suwon-si (KR)

(72) Inventors: Jung-wook Kim, Suwon-si (KR); Mee-jeong Park, Seoul (KR); Seung-young Shin, Seoul (KR); Hyoung-joo Ahn, Suwon-si (KR); Kyung-eun Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 916 days.

(21) Appl. No.: 14/995,602

(22) Filed: Jan. 14, 2016

(65) Prior Publication Data

US 2016/0210023 A1 Jul. 21, 2016

(30) Foreign Application Priority Data

Jan. 15, 2015 (KR) ........................ 10-2015-0007448

(51) Int. Cl.
*G06F 3/0481* (2013.01)
*G06F 3/01* (2006.01)
*G06Q 10/10* (2012.01)
*G06F 16/338* (2019.01)
*G06F 9/451* (2018.01)

(52) U.S. Cl.
CPC ............ *G06F 3/0481* (2013.01); *G06F 3/011* (2013.01); *G06F 16/338* (2019.01); *G06Q 10/10* (2013.01); *G06F 9/453* (2018.02)

(58) Field of Classification Search
CPC ............... G06F 9/453; G06F 17/30964; G06F 17/30976; G06F 3/0481; G06F 3/011; G06F 16/338; G06Q 10/10
See application file for complete search history.

(56) References Cited

U.S. PATENT DOCUMENTS

| 8,560,301 | B2 | 10/2013 | Kim |
| 9,286,910 | B1* | 3/2016 | Li ............................ G10L 25/48 |
| 9,823,811 | B2* | 11/2017 | Brown ................ G06F 3/04817 |
| 2009/0107398 | A1 | 4/2009 | Hassler, Jr. et al. |
| 2012/0016678 | A1 | 1/2012 | Gruber et al. |
| 2013/0290339 | A1* | 10/2013 | LuVogt ............. G06F 17/30867 707/740 |
| 2014/0074454 | A1 | 3/2014 | Brown et al. |
| 2015/0186156 | A1* | 7/2015 | Brown ................ G06F 3/04817 715/706 |

FOREIGN PATENT DOCUMENTS

| KR | 10-2009-0045020 A | 5/2009 |
| KR | 10-2009-0115828 A | 11/2009 |
| KR | 10-2010-0126004 A | 12/2010 |
| KR | 10-2011-0059178 A | 6/2011 |
| KR | 10-2013-0124799 A | 11/2013 |

* cited by examiner

Primary Examiner — Ting Z Lee
(74) Attorney, Agent, or Firm — Jefferson IP Law, LLP

(57) ABSTRACT

A device and a method of displaying a response to an inquiry are provided. The method of displaying a response includes obtaining an inquiry indicated by a received user input, determining a response, from among a plurality of responses corresponding to the inquiry, by using context information indicating context of a user, and displaying text indicating the determined response and an image of a subject providing the response.

17 Claims, 17 Drawing Sheets

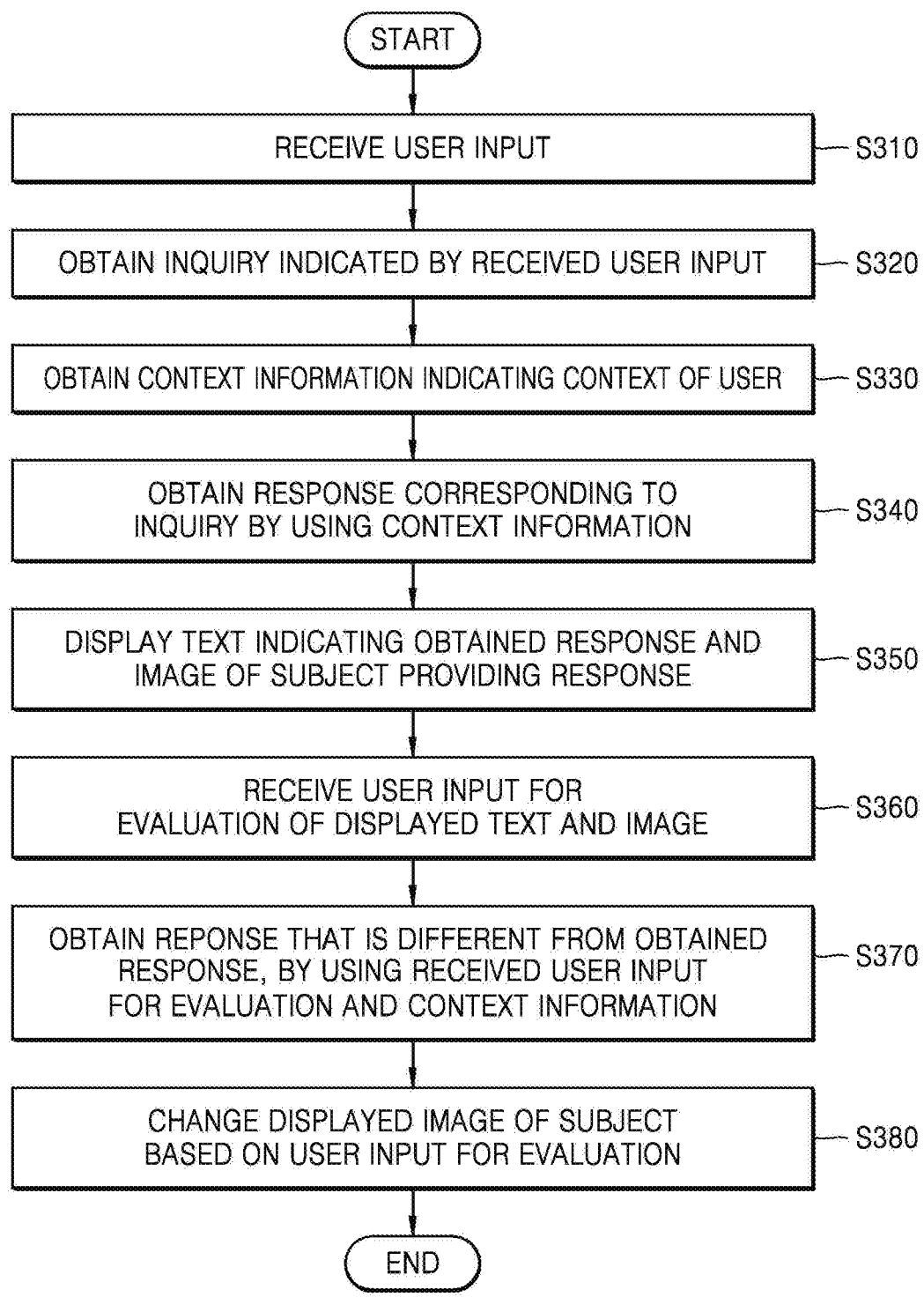

METHOD AND DEVICE FOR DISPLAYING RESPONSE

CROSS-REFERENCE TO RELATED APPLICATION(S)

This application claims the benefit under 35 U.S.C. § 119(a) of a Korean patent application filed on Jan. 15, 2015 in the Korean Intellectual Property Office and assigned Serial number 10-2015-0007448, the entire disclosure of which is hereby incorporated by reference.

TECHNICAL FIELD

The present disclosure relates to methods and devices for displaying a response. More particularly, the present disclosure relates to methods and devices for displaying a response corresponding to an inquiry by using context information.

BACKGROUND

As multimedia technology and processing technology continue to develop, a device may process increasingly diverse types of information. In particular, a device for displaying a response corresponding to a user input is being used. However, there has been a problem in that a same response is displayed with respect to a same user input.

Accordingly, there is a demand for a method of displaying an adaptive response corresponding to an inquiry by using context information indicating context of a user.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods and devices for outputting a context-adaptive response.

In accordance with an aspect of the present disclosure, a method, performed by a device, of displaying a response is provided. The method includes obtaining an inquiry indicated by a received user input, determining a response, from among a plurality of responses corresponding to the inquiry, by using context information indicating context of a user, and displaying text indicating the determined response and an image of a subject providing the response.

The method may further include receiving a user input for evaluation of the displayed text and the displayed image.

The method may further include determining a response that is different from the determined response, from among the plurality of responses, by using the received user input for the evaluation and the context information.

The method may further include changing the displayed image of the subject, based on a history of the received user input for the evaluation.

The method may further include selecting an avatar image from among a plurality of avatar images, based on the context information, wherein the displayed image of the subject is the selected avatar image.

The method may further include identifying a response category corresponding to the determined response, from among a plurality of response categories, and selecting an avatar image from among a plurality of avatar images according to the identified response category, wherein the displayed image of the subject is the selected avatar image.

The method may further include obtaining user information about the user and selecting an avatar image from among a plurality of avatar images based on the user information, wherein the displayed image of the subject is the selected avatar image.

The determining of the response may include obtaining a plurality of responses corresponding to the inquiry, obtaining the context information by using one or more sensors included in the device, and determining a response from among the plurality of responses by using the context information.

The determining of the response may include obtaining schedule information about the user, determining a schedule from among a plurality of schedules included in the schedule information by using the context information, and generating text indicating the response based on the determined schedule.

In accordance with another aspect of the present disclosure, a non-transitory computer-readable recording medium having recorded thereon a computer program which, when executed by a processor, causes the processor to control to perform the method provided above.

In accordance with another aspect of the present disclosure, a device configured to display a response is provided. The device includes an input receiving unit configured to receive a user input, a processor configured to obtain an inquiry indicated by the received user input, and determine a response, from among a plurality of responses corresponding to the inquiry, by using context information indicating context of a user, and a display configured to display text indicating the determined response and an image of a subject providing the response.

The input receiving unit may be configured to receive a user input for evaluation of the displayed text and the displayed image.

The processor may be configured to determine a response that is different from the determined response, from among the plurality of responses, by using the received user input for the evaluation and the context information.

The processor may be configured to change the displayed image of the subject, based on a history of the received user input for the evaluation.

The processor may be configured to select an avatar image from among a plurality of avatar images, based on the context information, and the displayed image of the subject may be the selected avatar image.

The processor may be configured to identify a response category corresponding to the determined response, from among a plurality of response categories, and select an avatar image from among a plurality of avatar images according to the identified response category, and the displayed image of the subject may be the selected avatar image.

The processor may be configured to obtain user information about the user, and select an avatar image from among a plurality of avatar images based on the user information, and the displayed image of the subject may be the selected avatar image.

The processor may be configured to obtain a plurality of responses corresponding to the inquiry, obtain the context information by using one or more sensors included in the device, and determine a response from among the plurality of responses by using the context information.

The processor may be configured to obtain schedule information about the user, determine a schedule from among a plurality of schedules included in the schedule information by using the context information, and generate text indicating the response based on the determined schedule.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a flowchart of a method of displaying, by the device, text indicating a response and an image of a subject providing the response according to various embodiments of the present disclosure;

Throughout the drawings, it should be noted that like reference numbers are used to depict the same or similar elements, features, and structures.

DETAILED DESCRIPTION

Figure 1:
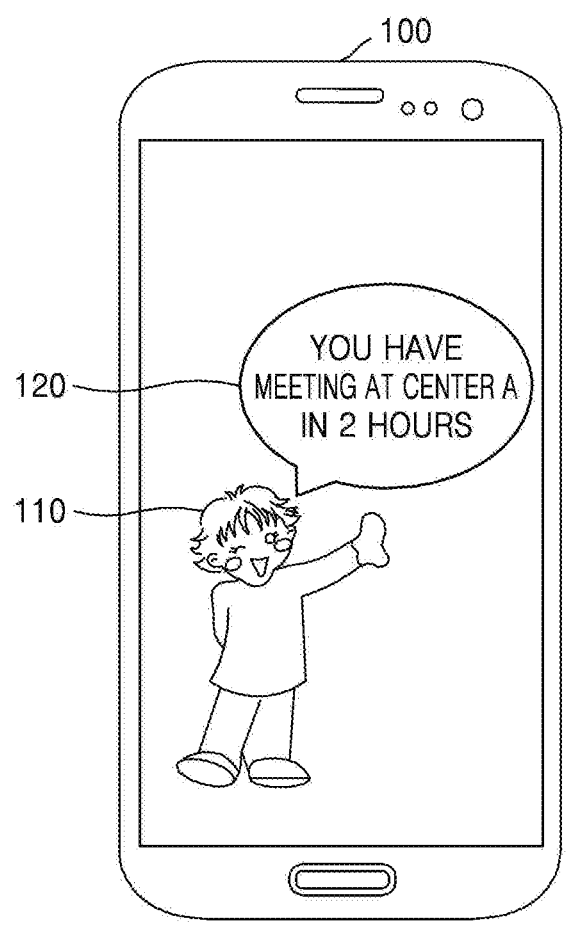
FIG. 1 illustrates an example of displaying, by a device, a response according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Advantages and features of the present disclosure and methods of accomplishing the same may be understood more readily with by reference to the following detailed description of various embodiments and the accompanying drawings. However, the present disclosure is not limited to the embodiments set forth herein, and may be embodied in many different forms. The embodiments are provided so that this disclosure will be thorough and complete, and will fully convey the concept of the present disclosure to those of ordinary skill in the art, and the scope of the present disclosure should be defined by the appended claims.

Terms used herein will be briefly described, and the present disclosure will be described in detail below.

General and widely-used terms have been employed herein, in consideration of functions provided in the present disclosure, and may vary according to an intention of one of ordinary skill in the art, a precedent, or emergence of new technologies. Additionally, in some cases, an applicant may arbitrarily select specific terms. Then, the applicant will provide the meaning of the terms in the description of the present disclosure. Accordingly, it will be understood that the terms, used herein, should be interpreted as having a meaning that is consistent with their meaning in the context of the relevant art and will not be interpreted in an idealized or overly formal sense unless expressly so defined herein.

It will be further understood that the terms "comprises," "comprising," "includes," and/or "including," when used herein, specify the presence of components, but do not preclude the presence or addition of one or more other components, unless otherwise specified. Additionally, a term "unit" means software or hardware components such as field programmable gate array (FPGA) or application-specific integrated circuit (ASIC), and a "unit" performs some functions. However, a "unit" is not limited to hardware or software. A "unit" may be configured to be included in a storage medium that may be addressed, or configured to play one or more processors. Accordingly, as an example, a "unit" includes components such as software components, object-oriented software components, class components, or task components, processes, functions, attributes, procedures, subroutines, segments of a program code, drivers, firmware, micro-codes, circuits, data, database, data structures, tables, arrays, or variables. Functions provided in components or "units" may be combined into a small number of components or "units", or separated into additional components or "units".

It will be understood that when an element is referred to as being "connected to" or "coupled to" another element, it may be "directly connected or coupled" to the other element, or "electrically connected to" the other element with intervening elements therebetween. It will be further understood that the terms "comprises", "comprising", "includes", and/or "including" when used herein, specify the presence of components, but do not preclude the presence or addition of one or more other components, unless otherwise specified.

A "user input" described herein may include at least one selected from the group consisting of a touch input, a keyboard input, a voice input, a sound input, a button input, a gesture input, and a multimodal input, but is not limited thereto.

A "touch input" used herein refers to a gesture that a user performs on a touchscreen or a cover so as to control a device 100. For example, a touch input described herein may include a tap, a touch and hold, a double-tap, a drag, panning, a flick, or a drag-and-drop.

A "button input" used herein refers to an input that a user performs so as to control the device 100 by using a physical button provided with the device 100.

A "gesture input" used herein may refer to an input that a user performs so as to move the device 100 so that the input is applied to the device 100. For example, a gesture input may include an input of rotating the device 100, tilting the device 100, or moving the device 100 in an upward, downward, left, or right direction. The device 100 may detect a gesture input predetermined by a user, by using an acceleration sensor, a tilt sensor, a gyroscope sensor, a 3-axis magnetic sensor, or the like.

Alternately, a "gesture input" used herein may refer to an input to the device 100 by a motion of a user so that the motion of the user is input to the device 100. According to an embodiment, a gesture input may include motion information that the device 100 obtains from outside. For example, a gesture input may include an input with respect to a motion of a user which is obtained by the device 100. According to an embodiment, the device 100 may receive a gesture input by detecting a motion of a user by using a camera, an infrared sensor, or the like.

Additionally, a "multimodal input" refers to an input in which at least two input methods are combined. For example, the device 100 may receive a touch input and a gesture input from a user, or receive a touch input and a voice input from the user.

Context information may refer to context information regarding the device 100. For example, context information may include information about a location of the device 100, time, weather, a state of the device 100, operation of the device 100, or an execution history of an application that is executed by the device 100.

Additionally, user information may refer to information about a user. For example, user information may include information about at least one selected from the group consisting of gender, age, job, name, a relationship status, and nationality of a user, whether the user is handicapped, and a physical constitution, fitness, and preference of the user.

Additionally, an "inquiry" used herein may refer to a request by a user for particular information with respect to the device 100. For example, an inquiry may include a request obtained from a user input. As another example, an inquiry may be expressed in an interrogative sentence. As another example, an inquiry may be expressed in a declarative sentence or a word. As another example, an inquiry may be obtained from a voice input by a user. As another example, an inquiry may include a request to display certain information on a screen of the device 100.

Additionally, a "response" used herein may refer to provision of an answer corresponding to an inquiry. For example, a response may include information corresponding to an inquiry. According to an embodiment, a response may be information requested by an inquiry. For example, a response to an inquiry asking, "How is the weather today?" may be information about today's weather. As another example, a response to an inquiry asking, "How does Namdaemun (the South Gate of Seoul) look?" may be an image of Namdaemun. As another example, a response to an inquiry asking about "my homepage" may be a website address used to access a homepage of a user.

The present disclosure will now be described more fully with reference to the accompanying drawings, in which various embodiments of the present disclosure are shown.

FIG. 1 illustrates an example of displaying, by the device 100, a response according to various embodiments of the present disclosure.

Referring to FIG. 1, the device 100 obtains a response corresponding to a received user input, and display text 120 indicating the obtained response and an image 110 of a subject providing the obtained response. For example, if the device 100 receives a voice input saying, "What is the schedule for today?", the device 100 may display the text 120 indicating information about the schedule for today. Additionally, the device 100 may display the text 120 and the image 110 of the subject providing the text 120 indicating the information about the schedule for today together.

The text 120 indicating the response and the image 110 of the image providing the response may be determined in correspondence with an inquiry.

The device 100 may be a smartphone, a tablet personal computer (PC), a PC, a smart television (TV), a cellular phone, a personal digital assistant (PDA), a laptop computer, a media player, a micro server, a global positioning system (GPS), an e-book terminal, a digital broadcasting terminal, a navigation system, a kiosk, a Moving Pictures Expert Group phase 1 or phase 2 (MPEG-1 or MPEG-2) audio layer 3 (MP3) player, a digital camera, a wearable device, or other mobile or non-mobile computing devices, but is not limited thereto. Additionally, the device 100 may be a wearable device that has a communication function and a data processing function, such as a watch, glasses, a hairband, a ring, or the like.

Figure 2:
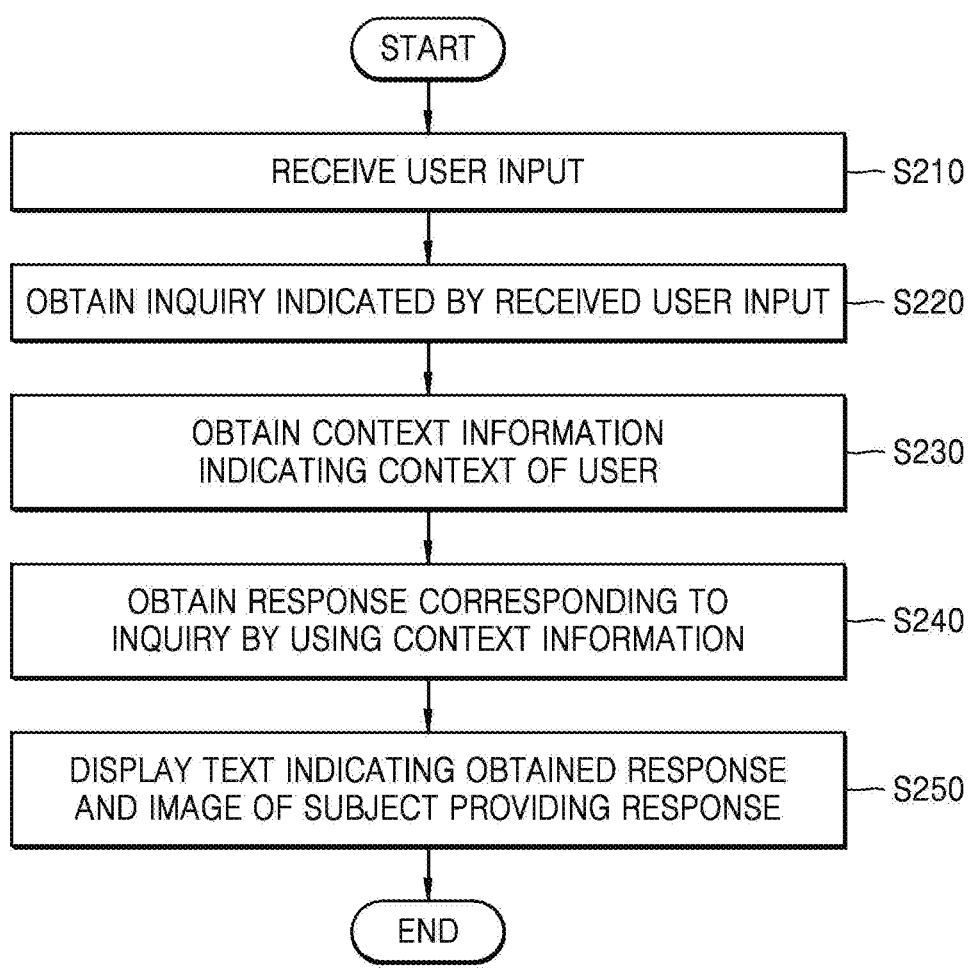
FIG. 2 is a flowchart of a method of displaying, by the device, text indicating a response and an image of a subject providing the response according to various embodiments of the present disclosure.

FIG. 2 is a flowchart of a method of displaying, by the device 100, text indicating a response and an image of a subject providing the response according to various embodiments of the present disclosure.

Referring to FIG. 2, in operation S210, the device 100 may receive a user input. A user input may be an input received from a user. For example, a user input may include at least one selected from the group consisting of a touch input, a keyboard input, a sound input, a button input, and a gesture input.

According to an embodiment, the device 100 may receive a user input by using a sensor included in the device 100. For example, the device 100 may receive a voice input from a user by using a microphone included in the device 100. As another example, the device 100 may receive a gesture input from a user by using an acceleration sensor included in the device 100. For example, if a user shakes the device 100 in upward and downward directions a certain number of times, the device 100 may receive a gesture input corresponding to the device 100 being shaken in the upward and downward directions the certain number of times.

In operation S220, the device 100 may obtain an inquiry that the received user input indicates. For example, the device 100 may obtain a request for certain information from a voice input received from the user. According to an embodiment, an inquiry may be expressed in an interrogative sentence.

According to an embodiment, if the device 100 receives a voice input saying, "What is the schedule for today?", the device 100 may obtain an inquiry requesting information about the user's schedule for today, and obtain information about the user's schedule for today in correspondence with the obtained inquiry.

According to an embodiment, if the device 100 receives a first button input from the user, the device 100 may obtain an inquiry corresponding to the first button input.

According to an embodiment, if the device 100 consecutively receives a first button input and a second button input from the user, the device 100 may obtain an inquiry corresponding to the first button input and the second button input which are consecutively received.

According to an embodiment, if the device 100 receives a first touch input from the user, the device 100 may obtain an inquiry corresponding to the first touch input.

According to an embodiment, if the device 100 receives a first touch input and a second touch input from the user within a certain interval of time, the device 100 may obtain an inquiry corresponding to the first touch input and the second touch input which are consecutively received.

According to an embodiment, if the device 100 receives a first gesture input from the user, the device 100 may obtain an inquiry corresponding to the first gesture input. For example, if the device 100 receives a gesture input corresponding to the device 100 being shaken in the upward and downward directions three times, the device 100 may obtain an inquiry asking, "What is the schedule for today?".

In operation S230, the device 100 may obtain context information indicating context of the user.

According to an embodiment, the device 100 may obtain context information by using a sensor included in the device 100. For example, the device 100 obtain location information about the device 100 by using a location detection sensor included in the device 100. As another example, the device 100 may obtain temperature information, time information, or noise information by using a sensor included in the device 100.

According to an embodiment, the device 100 may obtain context information from outside of the device 100. For example, the device 100 obtain time information, map information, weather information, news information, or the like from a server.

In operation S240, the device 100 may obtain a response corresponding to the inquiry by using the context information.

According to an embodiment, the device 100 may obtain a response based on the inquiry, obtained in operation S220, and the context information.

For example, if the device 100 obtains an inquiry asking, "How is the weather today?", the device 100 may obtain weather information about a region corresponding to a current location of the device 100. As another example, if the device 100 obtains an inquiry asking, "What is the schedule?", the device 100 may obtain information about a schedule planned for a period of time one hour from the present time. As another example, if the device 100 obtains an inquiry asking about "real-time search words", the device 100 may obtain information about real-time search words ranked $1^{st}$ through $10^{th}$ in a certain search engine at the present time. As another example, if the device 100 obtains an inquiry asking about "a route to Dongdaemun (the East Gate of Seoul)", the device 100 may obtain information about a route from a current location of the device 100 to Dongdaemun in consideration of current traffic volume. As another example, if the device 100 obtains an inquiry asking, "What clothes are recommended to be worn today?", the device 100 may obtain information about clothes that are to be recommended to be worn by the user today based on today's weather forecast.

According to an embodiment, the device 100 may select a response corresponding to context information, from among a plurality of responses corresponding to the inquiry obtained in operation S220.

For example, if the device 100 obtains an inquiry asking, "How is the weather today?", the device 100 may obtain weather information about a region corresponding to a current location of the device 100, from among weather information about a plurality of regions. As another example, if the device 100 obtains an inquiry asking, "What is the schedule?", the device 100 may obtain information about a schedule planned for a nearest future from the present time, from among the user's schedules for today. As another example, if the device 100 obtains an inquiry asking about "real-time search words", the device 100 may obtain information about real-time search words ranked $1^{st}$ through $10^{th}$ in a search engine that has been most frequently accessed, from among a plurality of search engines. As another example, if the device 100 obtains an inquiry asking about "a route to Dongdaemun", the device 100 may obtain information about a route from among a plurality of routes from a current location of the device 100 to Dongdaemun, in consideration of current traffic volume. As another example, if the device 100 obtains an inquiry asking, "What clothes are recommended to be worn today?", the device 100 may obtain information about clothes that are to be recommended to be worn by the user today from among information about a plurality of pieces of clothes stored in the device 100, based on today's weather forecast.

In operation S250, the device 100 may display text indicating the obtained response and an image of the subject providing the response.

According to an embodiment, the device 100 may obtain and display text indicating the response obtained in operation S240. For example, the device 100 may obtain and display a sentence indicating the obtained response.

For example, if the obtained response is information about a schedule planned for one hour from the present time, the device 100 may generate the text 120 indicating information about the schedule planned for one hour from the present time. As another example, if the obtained response is information about weather for today, the device 100 may generate text saying, "Sunny weather with a highest temperature of 7 degrees and a lowest temperature of 2 degrees is expected today".

According to an embodiment, text indicating a response may be expressed in one or more words. For example, text indicating a response may be expressed in a sentence. As another example, text indicating a response may be expressed by using a plurality of nouns.

For example, if the obtained response is real-time search words ranked $1^{st}$ through $10^{th}$, the device 100 may display the real-time search words ranked $1^{st}$ through $10^{th}$ in a text form.

According to an embodiment, text may be displayed in the form of a speech balloon.

According to an embodiment, the device 100 may display an image of a subject providing a response.

For example, the device 100 may display the image 110 of a subject providing text indicating a response. According to an embodiment, text may be displayed in the form of a speech balloon. Additionally, according to an embodiment, the device 100 may display an image of a subject providing text in the form of a speech balloon.

According to an embodiment, the device 100 may determine an image of a subject providing the response, from among a plurality of images. For example, the device 100 may determine an image of a subject providing the response, from among a plurality of images, by using context information.

According to an embodiment, an image of a subject providing a response may be an image of a certain character. According to an embodiment, an image of a subject providing a response may be an image of a personified subject.

FIG. 3 is a flowchart of a method of displaying, by the device 100, text indicating a response and an image of a subject providing the response according to various embodiments of the present disclosure.

Operations S310 through S350 respectively correspond to operations S210 through S250, and thus, a description thereof is not provided here again for the sake of brevity.

Referring to FIG. 3, in operation S360, the device 100 receives a user input for evaluation of text and an image displayed in operation S350.

According to an embodiment, the device 100 may display a screen for receiving a user input of for evaluation. For example, the device 100 may display text and an image in operation S350, and then, display a screen for receiving an input of a degree of satisfaction about the displayed text and the displayed image.

For example, the device 100 may display a screen for receiving an input for evaluation of the text and the image, displayed in operation S350, in the form of a score ranging from 0 to 100.

As another example, the device 100 may respectively display a first screen for receiving an input for evaluation of the text displayed in operation S350 and a second screen for receiving an input for evaluation of the image displayed in operation S350. According to an embodiment, the device 100 may display the first screen and the second screen at a same time. According to an embodiment, the device 100 may display the first screen before the second screen is displayed and, after the receiving of the evaluation of the text displayed in operation S350 is completed, display the second screen.

According to an embodiment, the first screen and the second screen may display one or more items. For example, the first screen may display at least one selected from the group consisting of an item for receiving an input for evaluation of whether content of the text displayed in operation S350 is appropriate, an item for receiving an input of a response intended by the user if the text displayed in operation S350 is not shown as intended by the user, and an item for requesting a change in a form of the text (for example, a font) displayed in operation S350. As another example, the second screen may display at least one selected from the group consisting of an item for receiving an input for evaluation of whether content of the image displayed in operation S350 is appropriate, an item for selecting an image that the user wants if the user wants to change the image displayed in operation S350, and an item for requesting a change in a form of the image (for example, a size or a color of the image) displayed in operation S350.

In operation S370, the device 100 obtains a response that is different from the response obtained in operation S340, by using the user input received in operation S360 and the context information. According to an embodiment, the device 100 may use the user input received in operation S360 when the device 100 obtains a response corresponding to an inquiry. The user input received in operation S360 may refer to a user input for evaluation.

For example, after the device 100 obtains a first response in operation S340, the device 100 may obtain a second response in operation S370 by using the user input received in operation S360. For example, with respect to an inquiry asking, "How is the weather today?", the device 100 may obtain information about weather for tomorrow in operation S370, according to a user input for evaluation which is received in operation S360 and requests weather for tomorrow. As another example, with respect to an inquiry asking, "What is the schedule?", after the device 100 obtains information about a schedule planned for a period of time of two hours from present time in operation S340, the device 100 may obtain information about a schedule planned for a period of time one hour from the present time in operation S370, according to a user input for evaluation which is received in operation S360 and requests a schedule planned for one hour from the present time.

In operation S380, the device 100 changes the image of the subject displayed based on the user input received in operation S360. For example, the device 100 may change the displayed image of the subject, based on a history of the user input received in operation S360.

According to an embodiment, the device 100 may change the displayed image of the subject based on the user input received in operation S360. For example, if the device 100 displays a first character image as the image of the subject in operation S350, the device 100 may change the displayed image of the subject into a second character image, according the user input that is received in operation S360 and requests to display the second character image as the image of the subject.

According to an embodiment, the device 100 may change the image of the subject based on a history of the user input received in operation S360.

According to an embodiment, if the device 100 receives the user input for evaluation of the displayed text and image a certain number of times or more, the device 100 may change the displayed image of the subject from the first character image to the second character image in operation S380. For example, the displayed image of the subject may be changed according to certain criteria in operation S380, based on a number of times for which the user input for the evaluation is received.

For example, if the user input for the evaluation is received 0 to 10 times, the device 100 may select a character image of a child as a displayed image of the subject in operation S380. As another example, if the user input for the evaluation is received 11 times to 20 times, the device 100 may select a character image of a teenager as a displayed image of the subject in operation S380. As another example, if the user input for the evaluation is received 21 times to 30 times, the device 100 may select a character image of a person in his/her 30s as a displayed image of the subject in operation S380. As another example, if the user input for the evaluation is received 31 times or more, the device 100 may select a character image of an elderly person as a displayed image of the subject in operation S380.

As another example, if the user input for the evaluation is received 0 times to 10 times, the device 100 may select a character image of a monkey as a displayed image of the subject in operation S380. As another example, if the user input for the evaluation is received 11 times to 20 times, the device 100 may select a character image of Australopithecus as a displayed image of the subject in operation S380. As another example, if the user input for the evaluation is received 21 times to 30 times, the device 100 may select a character image of Homo sapiens as a displayed image of the subject in operation S380. As another example, if the user input for the evaluation is received 31 times or more, the device 100 may select a character image of a modern human as a displayed image of the subject in operation S380.

According to an embodiment, if an average evaluation score that the device 100 obtains according to a user input for evaluation of the displayed text and image is equal to or greater than a value according to certain criteria, the device 100 may change the displayed image of the subject from the first character image to the second character image in operation S380.

For example, an average evaluation score obtained according to the user input for the evaluation ranges from 0 to 25, the device 100 may select a character image of a child as a displayed image of the subject in operation S380. As another example, an average evaluation score obtained according to the user input for evaluation ranges from 26 to 50, the device 100 may select a character image of a teenager as a displayed image of the subject in operation S380. As another example, an average evaluation score obtained according to the user input for evaluation ranges from 51 to 75, the device 100 may select a character image of a person in his/her 30s as a displayed image of the subject in operation S380. As another example, an average evaluation score obtained according to the user input for evaluation ranges from 76 to 100, the device 100 may select a character image of an elderly person as a displayed image of the subject in operation S380.

Figure 4A:
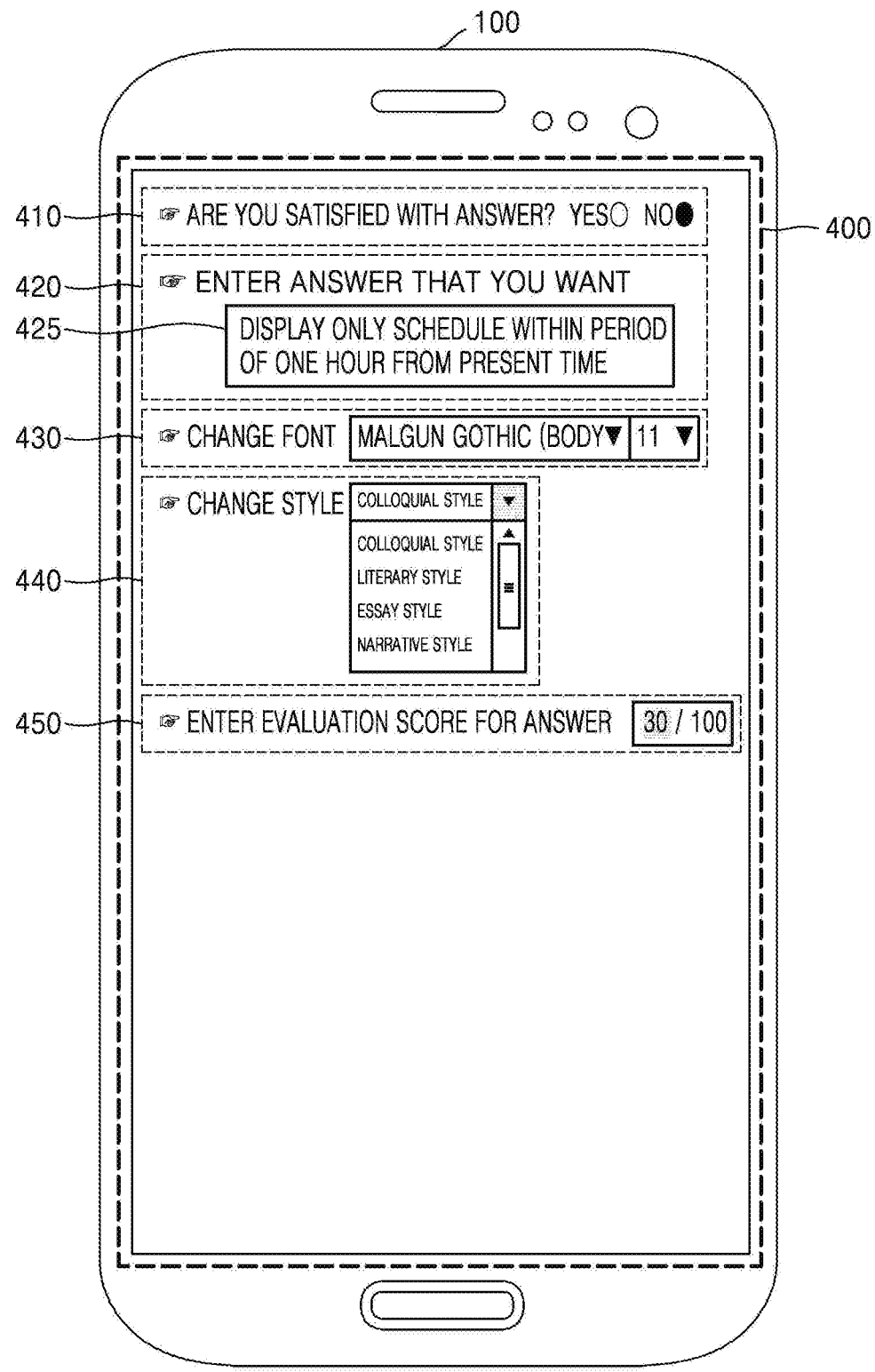
FIG. 4A illustrates an example of receiving, by the device, a user input for evaluation of displayed text according to various embodiments of the present disclosure.

FIG. 4A illustrates an example of receiving, by the device 100, a user input for evaluation of displayed text according to various embodiments of the present disclosure.

The description provided with reference to operation S360 in FIG. 3 may be applied to a description of FIG. 4A.

Referring to FIG. 4A, according to an embodiment, the device 100 may obtain a response corresponding to an inquiry by using context information. According to an embodiment, the device 100 may display text indicating the obtained response. Additionally, according to an embodiment, the device 100 may display a first screen 400 used to receive an input for evaluation of the displayed text.

For example, the first screen 400 may display an item 410 for evaluating whether a user is satisfied with the displayed text.

As another example, if a user is not satisfied with the displayed text, the first screen 400 may display an item 420 for receiving an input of a response that the user wants. In detail, the device 100 may display an item 425 for receiving an input of a response, which the user wants, in the form of text, or display an item (not shown) for receiving an input of a selection of a response that the user wants.

As another example, the first screen 400 may display an item 430 for receiving an input of a change in a font of the displayed text.

As another example, the first screen 400 may display an item 440 for receiving an input of a change in a style of the displayed text.

As another example, the first screen 400 may display an item 450 for receiving an input of whole evaluation of the displayed text.

Figure 4B:
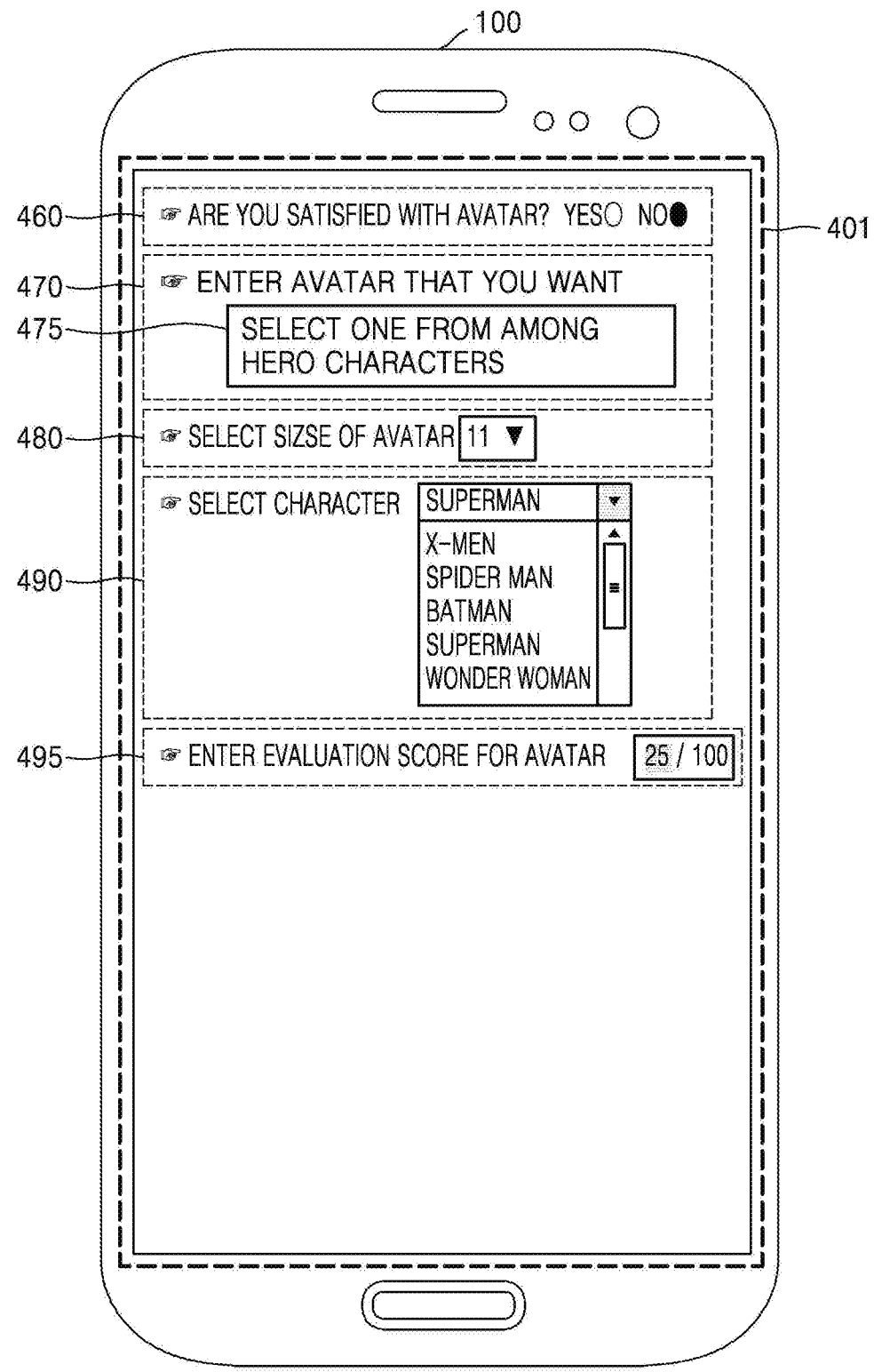
FIG. 4B illustrates an example of receiving, by the device, a user input for evaluation of a displayed image of a subject according to various embodiments of the present disclosure.

FIG. 4B illustrates an example of receiving, by the device 100, a user input for evaluation of a displayed image of a subject according to various embodiments of the present disclosure.

The description provided with reference to operation S360 in FIG. 3 may be applied to a description of FIG. 4B.

Referring to FIG. 4B, according to an embodiment, the device 100 may obtain a response corresponding to an inquiry by using context information. According to an embodiment, the device 100 may display an image of a subject providing the obtained response. For example, the device 100 may display an image of a character providing text, which indicates the obtained response, in the form of a speech balloon. Additionally, according to an embodiment, the device 100 may display a second screen 401 that is used to receive an input for evaluation of the displayed image of the subject.

For example, the second screen 401 may display an item 460 for receiving an input of evaluating whether a user is satisfied with the displayed image of the subject.

As another example, if the user is not satisfied with the displayed image of the subject, the second screen 401 may display an item 470 for receiving an input of information about an image of a subject that the user wants. In detail, the device 100 may display an item 475 for receiving an input of an image of a subject which the user wants in the form of text, or display an item (not shown) for receiving an input of a selection of an image of a subject which the user wants.

As another example, the second screen 401 may display an item 480 for receiving an input of a change in a size of the displayed image of the subject.

As another example, the second screen 401 may display an item 490 for receiving an input of a selection of a displayed character.

As another example, the second screen 401 may display an item 495 for receiving an input of whole evaluation of a displayed image of the subject.

Figure 5:
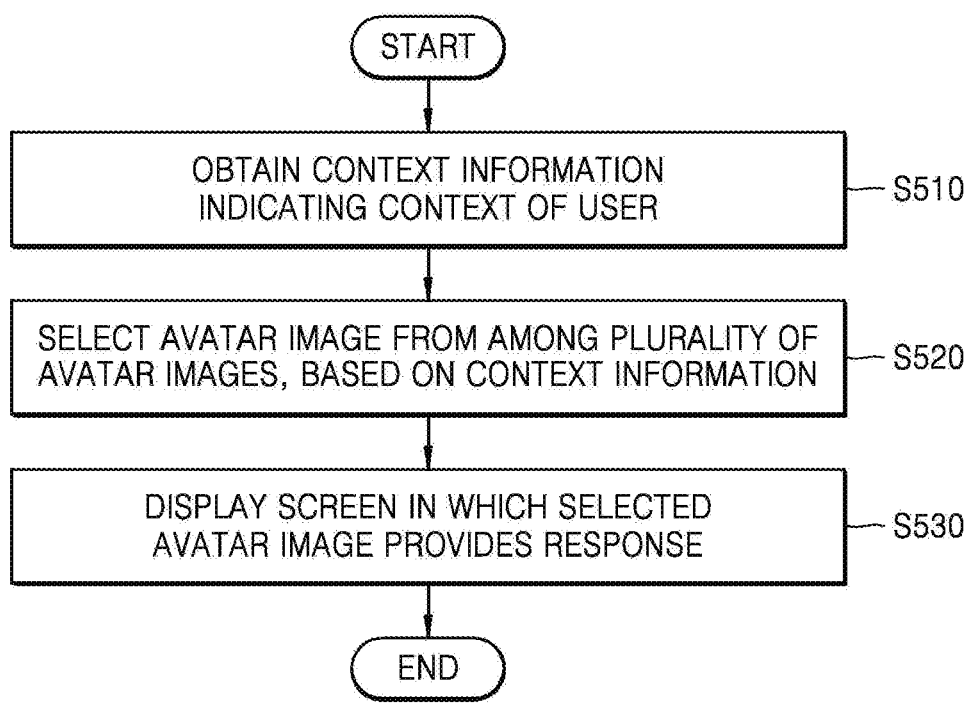
FIG. 5 is a flowchart of a method of displaying, by the device, a screen providing via an avatar a response based on context information according to various embodiments of the present disclosure.

FIG. 5 is a flowchart of a method of displaying, by the device 100, a screen providing via an avatar a response based on context information according to various embodiments of the present disclosure.

Operation S510 corresponds to operation S230, and thus, a description thereof is not provided here again for the sake of brevity.

Referring to FIG. 5, in operation S520, according to an embodiment, the device 100 selects an avatar image from among a plurality of avatar images based on context information.

For example, if it is raining now, the device 100 may select an avatar image of an avatar that is using an umbrella, from among a plurality of avatar images, as an image for providing a response.

As another example, if the device 100 is located in America, the device 100 may select an avatar image of an American, from among a plurality of avatar images, as an image for providing a response.

As another example, if it is dawn local time, the device 100 may select an avatar image of an avatar wearing pajamas, from among avatar images, as an image for providing a response.

As another example, if the device 100 is located in a company at present, the device 100 may select an avatar image of an avatar wearing clothes of a company worker, from among a plurality of avatar images, as an image for providing a response.

In operation S530, according to an embodiment, the device 100 displays a screen in which an avatar image, selected in operation S520, provides a response.

The description provided with reference to operation S250 may be applied to a description of operation S530.

For example, according to an embodiment, the device 100 may display text indicating a response, determined based on an inquiry and context information, in a form of a speech balloon, and display a scene in which the displayed text is provided by the avatar image selected in operation S520.

Figure 6:
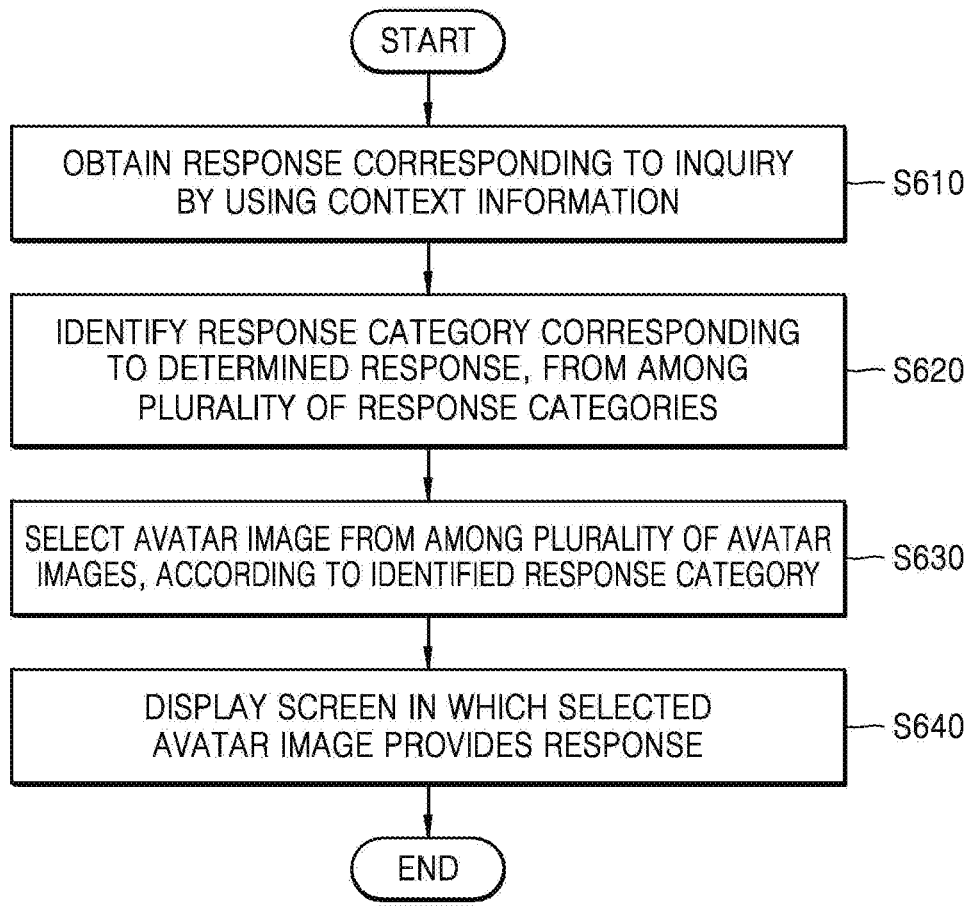
FIG. 6 is a flowchart of a method of displaying, by the device, a screen providing a response according to a response category corresponding to a determined response according to various embodiments of the present disclosure.

FIG. 6 is a flowchart of a method of displaying, by the device 100, a screen providing a response according to a response category corresponding to a determined response according to various embodiments of the present disclosure.

Operation S610 corresponds to operation S240, and thus, a description thereof is not provided here again for the sake of brevity.

Referring to FIG. 6, in operation S620, according to an embodiment, the device 100 identifies a response category corresponding to a response, determined in operation S610, from among a plurality of response categories.

For example, if an inquiry says, "What is a method of making soybean paste stew", the device 100 may determine information about a recipe for soybean paste stew as a response. In this case, the device 100 may identify a cooking category, from among three response categories including a machine category, a cooking category, and a business category, as a category corresponding to the determined response.

As another example, if the response determined in operation S610 is information about a business schedule for today, the device 100 may identify the business category, from among the three response categories including the machine category, the cooking category, and the business category, as a category corresponding to the determined response.

As another example, if the response determined in operation S610 is information about a method of automotive repair, the device 100 may identify the machine category, from among the three response categories including the machine category, the cooking category, and the business category, as a category corresponding to the determined response.

In operation S630, according to an embodiment, the device 100 selects an avatar image from among a plurality of avatar images, according to the response category identified in operation S620.

For example, if the response determined in operation S610 is information about a recipe for soybean paste stew and the response category identified in operation S620 is the cooking category, the device 100 may select an avatar image of an avatar wearing clothes for a cook, from among a plurality of avatar images.

As another example, if the response determined in operation S610 is information about a business schedule for today and the response category identified in operation S620 is the business category, the device 100 may select an avatar image of an avatar wearing clothes for a business person, from among the plurality of avatar images.

As another example, if the response determined in operation S610 is information about a method of automotive repair and the response category identified in operation S620 is the machine category, the device 100 may select an avatar image of an avatar wearing clothes for an auto mechanic, from among the plurality of avatar images.

Operation S640 corresponds to operation S530, and thus, a description thereof is not provided here again for the sake of brevity.

Figure 7:
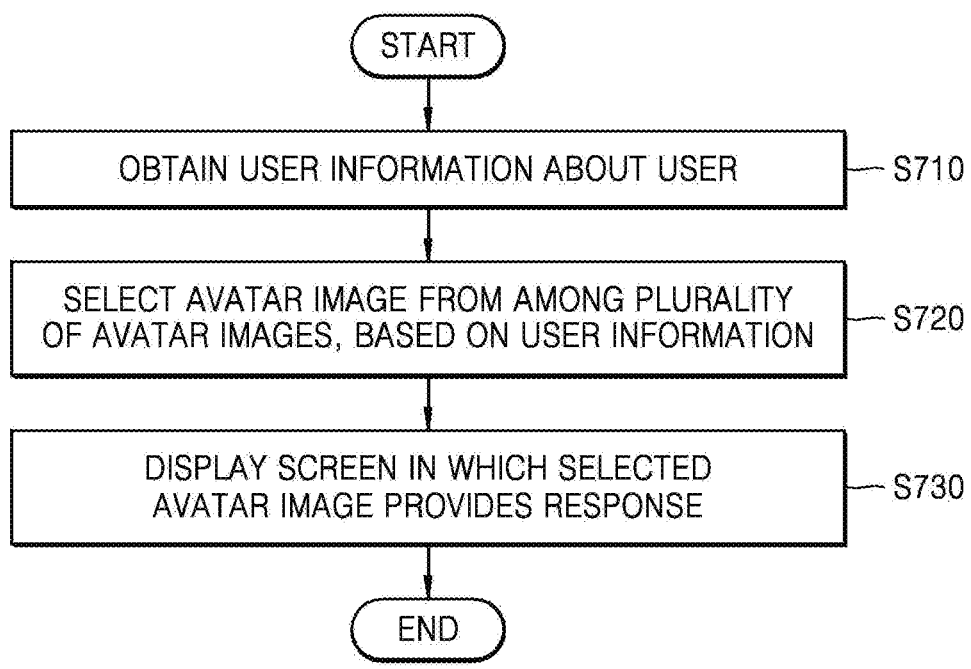
FIG. 7 is a flowchart of a method of displaying, by the device, a screen providing a response according to user information according to various embodiments of the present disclosure.

FIG. 7 is a flowchart of a method of displaying, by the device 100, a screen providing a response according to user information according various embodiments of the present disclosure.

Referring to FIG. 7, in operation S710, according to an embodiment, the device 100 may obtain user information.

According to an embodiment, user information may refer to information about a user. For example, user information may include information about at least one selected from the group consisting of gender, age, job, name, a relationship status, and nationality of a user, whether the user is handicapped, and a physical constitution, fitness, and preference of the user.

According to an embodiment, the device 100 may obtain user information by receiving an input from a user. According to an embodiment, the device 100 may obtain user information by receiving the user information from a server.

In operation S720, according to an embodiment, the device 100 may select an avatar image from among a plurality of avatar images based on the user information.

For example, if the user is Korean, the device 100 may select an avatar image of Korean, from among the plurality of avatar images, as an image providing a response.

As another example, if the user is a business person, the device 100 may select an avatar image of a business person, from among the plurality of avatar images, as an image providing a response.

As another example, if a hobby of the user is to play badminton, the device 100 may select an avatar image of a badminton player, from among the plurality of avatar images, as an image providing a response.

As another example, if the user is overweight, the device 100 may select an avatar image of a fitness trainer, from among the plurality of avatar images, as an image providing a response.

As another example, if the user is a fan of a certain entertainer, the device 100 may select an avatar image of the entertainer, from among the plurality of avatar images, as an image providing a response.

As another example, if the user has purchased a table-tennis paddle, the device 100 may select an avatar image of a table tennis player, from among the plurality of avatar images, as an image providing a response.

Operation S730 corresponds to operation S530, and thus, a description thereof is not provided here again for the sake of brevity.

Figure 8:
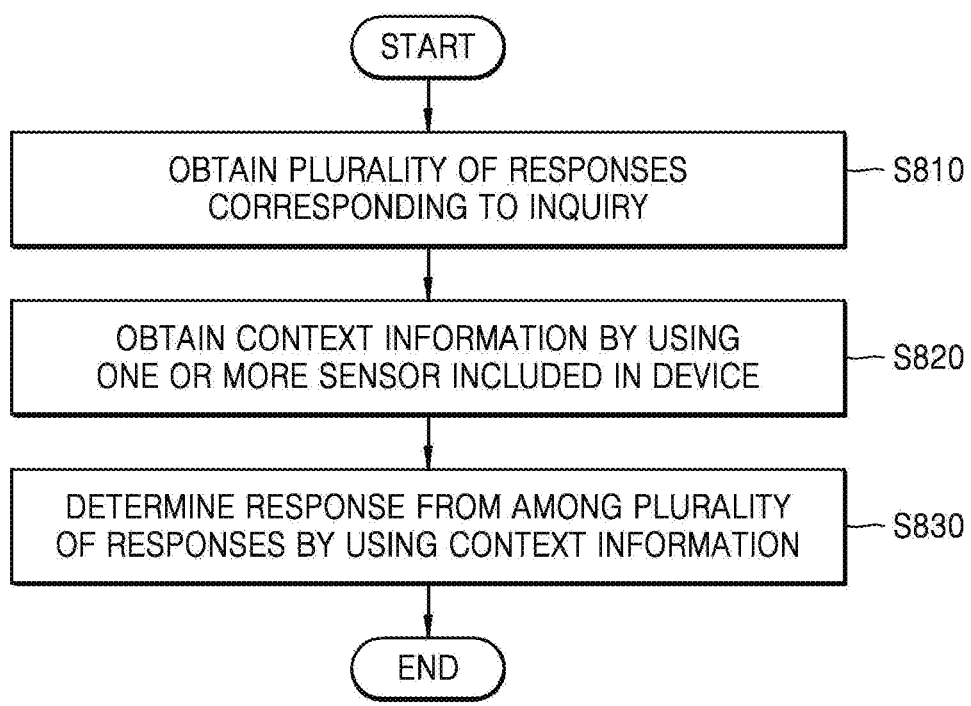
FIG. 8 is a flowchart of a method of determining, by the device, a response from among a plurality of responses by using context information according to various embodiments of the present disclosure.

FIG. 8 is a flowchart of a method of determining, by the device 100, a response from among a plurality of responses by using context information according to various embodiments of the present disclosure.

Referring to FIG. 8, in operation S810, the device 100 obtains a plurality of responses corresponding to an inquiry.

For example, if the device 100 obtains an inquiry asking, "How is the weather today?", the device 100 may obtain weather information about $1^{st}$ through $10^{th}$ regions. As another example, if the device 100 obtains an inquiry asking, "What is the schedule?", the device 100 may obtain information about first through third schedules which are planned for the user for today. As another example, if the device 100 obtains an inquiry asking about "a route to Dongdaemun", the device 100 may obtain information about a plurality of routes from a current location of the device 100 to Dongdaemun. As another example, if the device 100 obtains an inquiry asking, "What clothes are recommended to be worn today?", the device 100 may obtain information about a plurality of pieces of clothes stored in the device 100.

In operation S820, the device 100 obtains context information by using one or more sensors included in the device 100.

For example, the device 100 may obtain location information about the device 100 by using a location detection sensor included in the device 100. As another example, the device 100 may obtain temperature information, time information, or noise information by using a sensor included in the device 100.

According to an embodiment, the device 100 may obtain context information from outside of the device 100. For example, the device 100 obtain time information, map information, weather information, news information, or the like from a server.

In operation S830, the device 100 may obtain a response, from among the plurality of responses obtained in operation S810, by using the context information obtained in operation S820.

For example, if the device 100 obtains an inquiry asking, "How is the weather today?", the device 100 may obtain weather information about a region corresponding to a current location of the device 100, from among weather information about a plurality of regions. As another example, if the device 100 obtains an inquiry asking, "What is the schedule?", the device 100 may obtain information about a schedule planned for a nearest future from the present time, from among the user's schedules for today. As another example, if the device 100 obtains an inquiry asking about "real-time search words", the device 100 may obtain information about real-time search words ranked $1^{st}$ through $10^{th}$ in a search engine that has been most frequently accessed, from among a plurality of search engines. As another example, if the device 100 obtains an inquiry asking about "a route to Dongdaemun", the device 100 may obtain information about a route from among a plurality of routes from a current location of the device 100 to Dongdaemun, in consideration of current traffic volume. As another example, if the device 100 obtains an inquiry asking, "What clothes are recommended to be worn today?", the device 100 may obtain information about clothes that are to be recommended to be worn by the user today, from among information about a plurality of pieces of clothes stored in the device 100, based on today's weather forecast.

Figure 9:
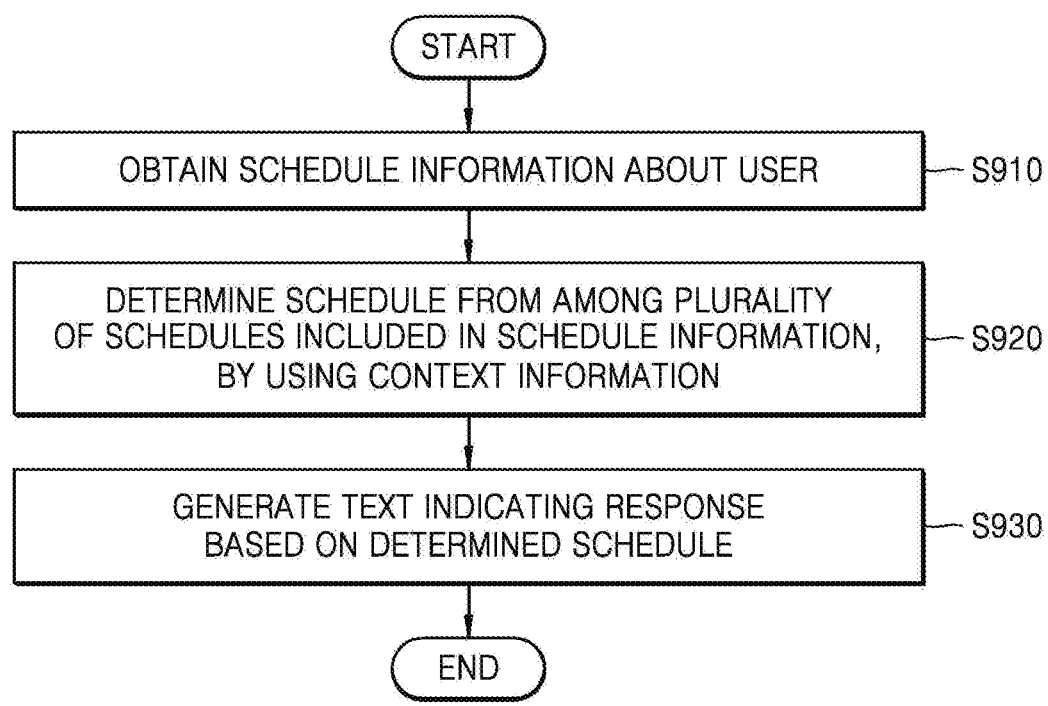
FIG. 9 illustrates an example of generating, by the device, text indicating a response based on a schedule according to various embodiments of the present disclosure.

FIG. 9 illustrates an example of generating, by the device 100, text indicating a response based on a schedule according to various embodiments of the present disclosure.

Referring to FIG. 9, in operation S910, the device 100 may obtain schedule information about a user.

For example, the device 100 may obtain schedule information about the user via a user input.

As another example, the device 100 may obtain schedule information about the user from outside of the device 100. For example, the device 100 may receive schedule information about the user from a server.

In operation S920, the device 100 may determine a schedule from among a plurality of schedules included in the schedule information, by using context information.

For example, the device 100 may determine a second schedule that is a schedule planned for a nearest future from the present time, from among first through third schedules included in the schedule information, by using current time information.

As another example, the device 100 may determine a third schedule that is a schedule to be performed in a nearest location from a current location of the device 100, from among first through third schedules included in the schedule information, by using current location information.

In operation S930, the device 100 may generate text indicating a response based on the schedule determined in operation S920.

According to an embodiment, the device 100 may generate text indicating the schedule determined in operation S920. For example, if there is a planned schedule in 3 hours, the device 100 may generate text saying, "You have a meeting related to sales for a first half year at a tower B in 3 hours".

Figure 10:
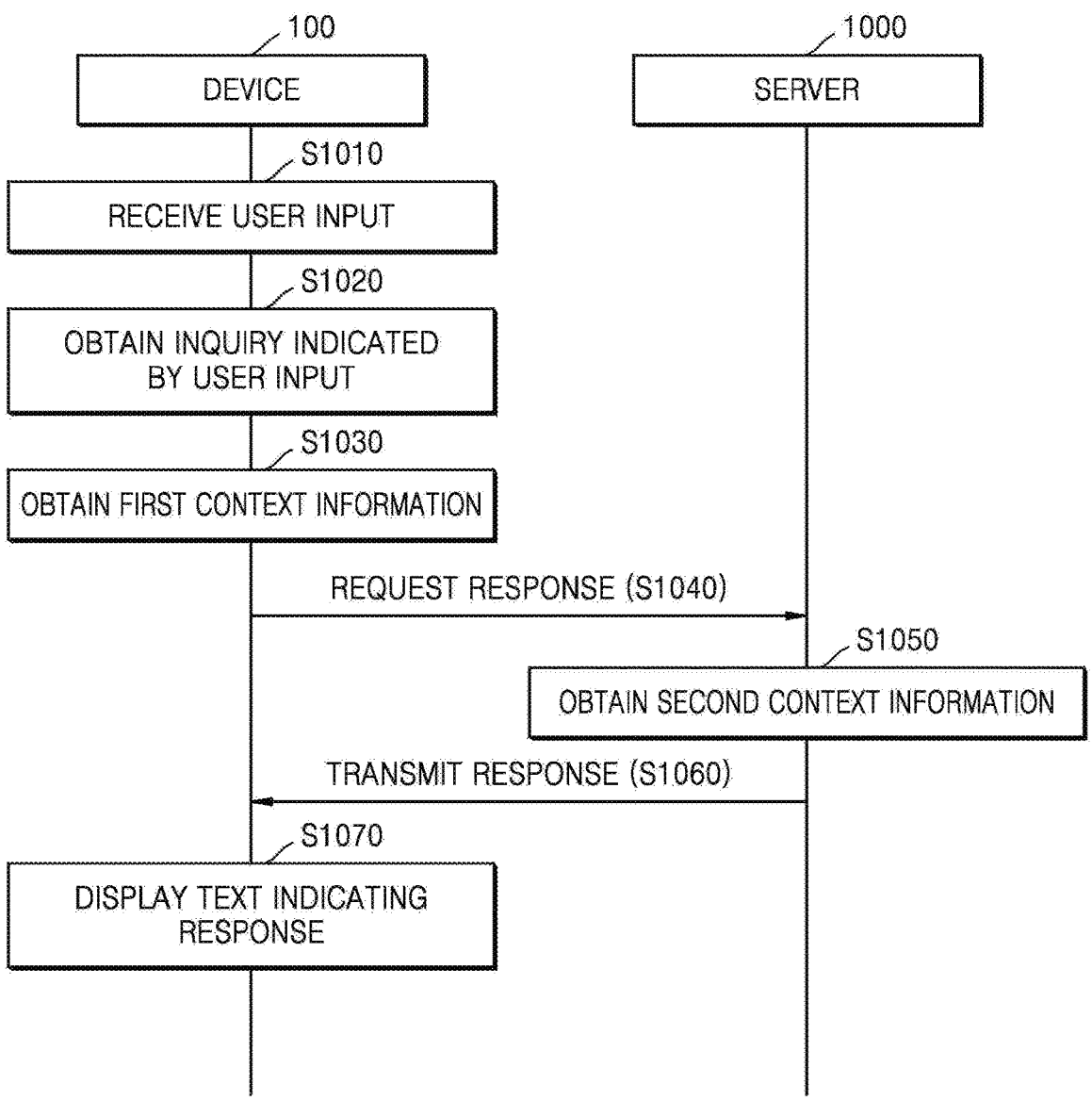
FIG. 10 illustrates an example in which the device works with a server according to various embodiments of the present disclosure.

FIG. 10 illustrates an example in which the device 100 works with a server 1000 according to various embodiments of the present disclosure.

Referring to FIG. 10, in operation S1010, according to an embodiment, the device 100 receives a user input. Operation S1010 corresponds to operation S210 described above, and thus, a description thereof is not provided here again for the sake of brevity.

In operation S1020, according to an embodiment, the device 100 obtains an inquiry that the user input indicates. Operation S1020 corresponds to operation S220 described above, and thus, a description thereof is not provided here again for the sake of brevity In operation S1030, according to an embodiment, the device 100 obtains first context information.

According to an embodiment, the first context information may refer to context information obtained by the device 100. According to an embodiment, the device 100 may obtain first context information by using a sensor included in the device 100. For example, the device 100 may obtain location information about the device 100 by using a location detection sensor included in the device 100. As another example, the device 100 may obtain temperature information, time information, or noise information by using a sensor included in the device 100.

In operation S1040, according to an embodiment, the device 100 requests a response from the server 1000.

According to an embodiment, the device 100 may request a response from the server 1000, based on the inquiry and the first context information.

For example, if the device 100 obtains an inquiry asking, "How is the weather today?", the device 100 may obtain weather information about a region corresponding to a current location of the device 100. As another example, if the device 100 obtains an inquiry asking, "What is the schedule?", the device 100 may obtain information about a schedule planned for a period of time of one hour from present time. As another example, if the device 100 obtains an inquiry asking about "real-time search words", the device 100 may obtain information about real-time search words ranked $1^{st}$ through $10^{th}$ in a certain search engine at the present time. As another example, if the device 100 obtains an inquiry asking about "a route to Dongdaemun", the device 100 may obtain information about a route from a current location of the device 100 to Dongdaemun in consideration of current traffic volume. As another example, if the device 100 obtains an inquiry asking, "What clothes are recommended to be worn today?", the device 100 may obtain information about clothes that are to be recommended to be worn by the user today based on today's weather forecast.

In operation S1050, according to an embodiment, the device 100 obtains second context information.

According to an embodiment, the second context information may refer to context information obtained by the server 1000.

According to an embodiment, the server 1000 may obtain the second context information. For example, the server 1000 may obtain time information, map information, weather information, news information, or the like.

In operation S1060, according to an embodiment, the server 1000 transmits a response to the device 100.

According to an embodiment, the server 1000 may obtain a response in correspondence with the request received in operation S1040 by using the second context information, and transmit the obtained response to the device 100.

For example, if information requested by the device 100 is weather information about a region corresponding to a current location of the device 100, the server 1000 may obtain the weather information about the current location of the device 100 and transmit the weather information to the device 100. As another example, if information requested by the device 100 is information about a schedule planned for a period of time of one hour from present time and the schedule planned for the period of time one hour from the present time includes a first schedule and a second schedule, the server 1000 may obtain information about a location planned for the first schedule and a location planned for the second schedule, and transmit the information about the first schedule and the information about the second schedule together with the information about the locations to the device 100.

In operation S1070, according to an embodiment, the device 100 displays text indicating the response received from the server 1000. The description provided with reference to operation S250 may be applied to a description about operation S1070.

Figure 11:
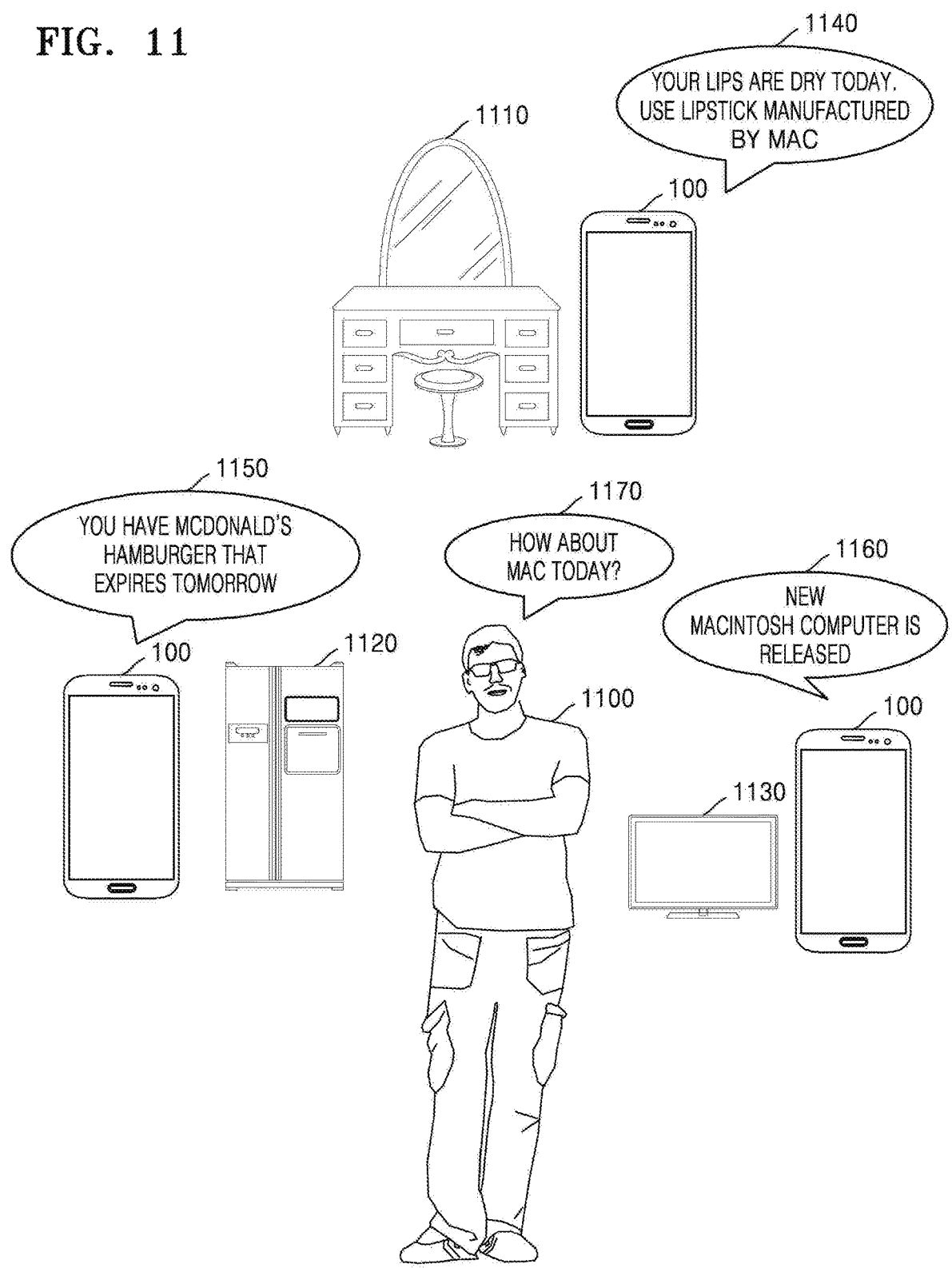
FIG. 11 illustrates an example of displaying, by the device, a response based on context information according to various embodiments of the present disclosure.

FIG. 11 illustrates an example of displaying, by the device 100, a response based on context information according to various embodiments of the present disclosure.

Referring to FIG. 11, according to an embodiment, the device 100 may receive a voice input asking "How about MAC today?" from a user 1100. According to an embodiment, the device 100 may obtain an inquiry 1170 asking, "How about MAC today?" according to the received voice input 1170. Then, according to an embodiment, the device 100 may obtain a response corresponding to the inquiry by using context information.

According to an embodiment, the device 100 may obtain information about types of apparatuses in a periphery of the device 100, and obtain a response corresponding to an inquiry by using the information about the types of the apparatuses in the periphery of the device 100.

For example, if a dressing table 1110 is located within a certain distance from the device 100 and the device 100 obtains context information indicating that lips of a user are dry, the device 100 may determine information about lipstick with a brand name of MAC as a response corresponding to the inquiry 1170 asking, "How about MAC today?". In this case, the device 100 may display text 1140 saying, "Your lips are dry today. Use lipstick manufactured by MAC."

As another example, if a refrigerator 1120 is located within a certain distance from the device 100 and the device 100 obtains context information indicating that a McDonald's hamburger that expires tomorrow is in the refrigerator 1120, the device 100 may determine information about a hamburger with a brand name of McDonald's as a response corresponding to an inquiry 1170 asking, "How about MAC today?". In this case, the device 100 may display text 1150 saying, "You have a McDonald's hamburger that expires tomorrow in your refrigerator".

If a computer 1130 is located within a certain distance from the device 100 and the device 100 obtains context information indicating that a new Macintosh computer is released, the device 100 may determine information about a newly released Macintosh computer as a response corresponding to an inquiry 1170 asking, "How about MAC today?". In this case, the device 100 may display text 1160 saying, "A new Macintosh computer has been released".

Figure 12A:
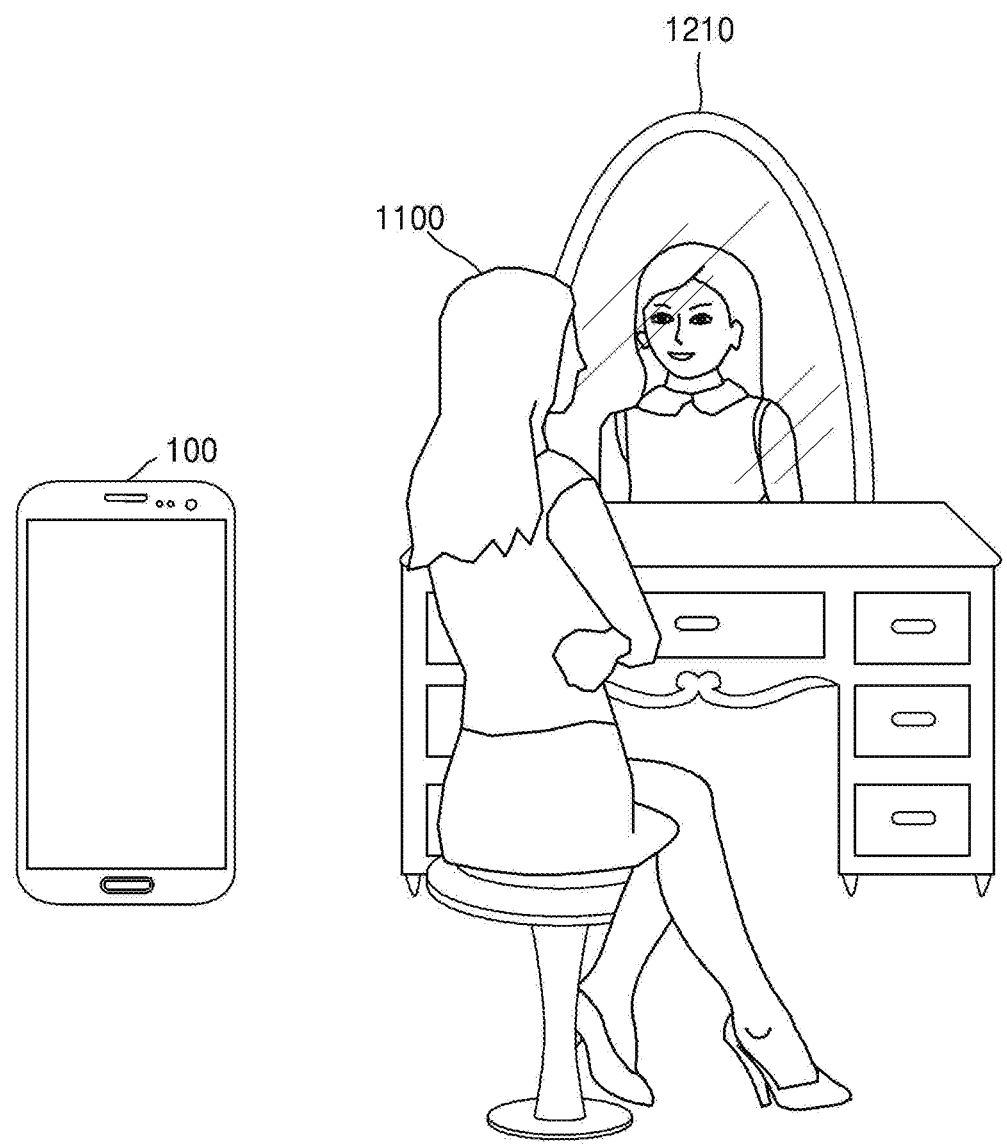
FIG. 12A illustrates an example of displaying, by the device, a response based on context information according to various embodiments of the present disclosure.

FIG. 12A illustrates an example of displaying, by the device 100, a response based on context information according to various embodiments of the present disclosure.

Referring to FIG. 12A, according to an embodiment, the device 100 may obtain information about whether the dressing table 1210 is located within a certain distance from the device 100. For example, the device 100 may determine whether the device 100 is located within a certain distance from the dressing table 1210 by using a location sensor included in the device 100.

According to an embodiment, the dressing table 1210 may include one or more sensors. In this case, the dressing table 1210 may obtain context information by using the one or more sensors included in the dressing table 1210. Context information may include state information about a user 1100. For example, the dressing table 1210 may obtain information about a skin state, a lip state, a facial expression, or the like of the user.

If the dressing table 1210 is located within a certain distance from the device 100, the device 100 may obtain context information from the dressing table 1210. According to an embodiment, the device 100 may obtain a response corresponding to an inquiry by using context information obtained from a sensor included in the device 100 and context information obtained from the dressing table 1210. In this case, the device 100 may display the obtained response as text. Additionally, the device 100 may display an image of a subject providing the response and the text together.

For example, if the dressing table 1210 obtains context information indicating that lips of the user 1100 are dry, the device 100 may display text saying, "Your lips are dry today. Use lip balm." in correspondence with an inquiry asking, "How about today?".

Figure 12B:
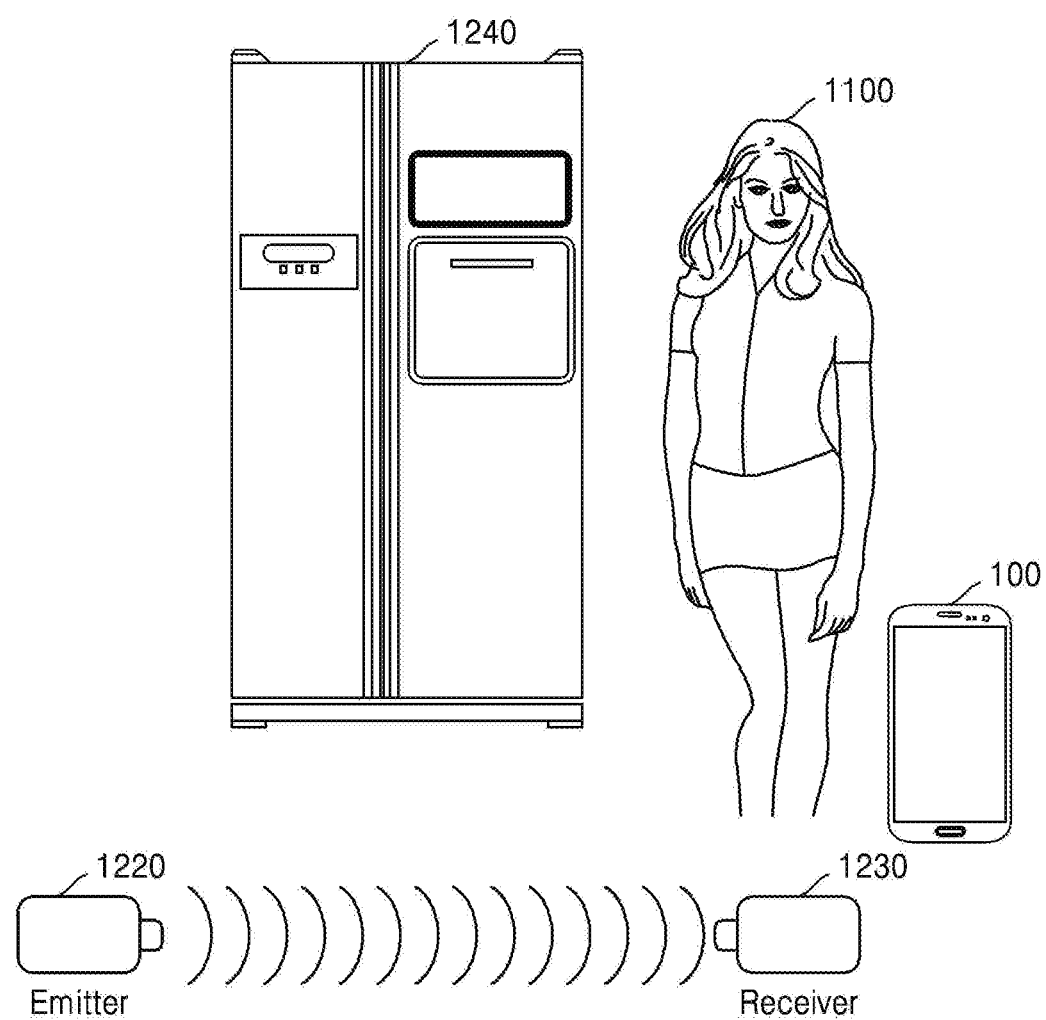
FIG. 12B illustrates an example of displaying, by the device, a response based on context information according to various embodiments of the present disclosure.

FIG. 12B illustrates an example of displaying, by the device 100, a response based on context information according to various embodiments of the present disclosure.

Referring to FIG. 12B, according to an embodiment, the device 100 may obtain information about whether the refrigerator 1240 is located within a certain distance from the device 100. For example, the device 100 may determine whether the refrigerator 1240 is located within a certain distance from the device 100 by using an electromagnetic wave reception sensor 1230 included in the device 100 and an electromagnetic wave emission sensor 1220 included in the refrigerator 1240.

According to an embodiment, the refrigerator 1240 may include one or more sensors. In this case, the refrigerator 1240 may obtain context information by using the one or more sensors included in the refrigerator 1240. The context information may include state information about food stored in the refrigerator 1240. For example, the refrigerator 1240 may obtain information about an expiry date of food, a storage period of food, whether food spoiled, a type of food, whether food preferred by the user 1100 is stored, or the like.

If the refrigerator 1240 is located within a certain distance from the device 100, the device 100 may obtain context information from the refrigerator 1240. According to an embodiment, the device 100 may obtain a response corresponding to an inquiry by using context information obtained from a sensor included in the device 100 and context information obtained from the refrigerator 1240. In this case, the device 100 may display the obtained response as text. Additionally, the device 100 may display the text and an image of a subject providing the response together.

For example, if food whose expiry date is tomorrow is stored in the refrigerator 1240, the device 100 may display text saying, "A hamburger that expires tomorrow is stored", in correspondence with an inquiry asking, "How about today?".

Figure 13:
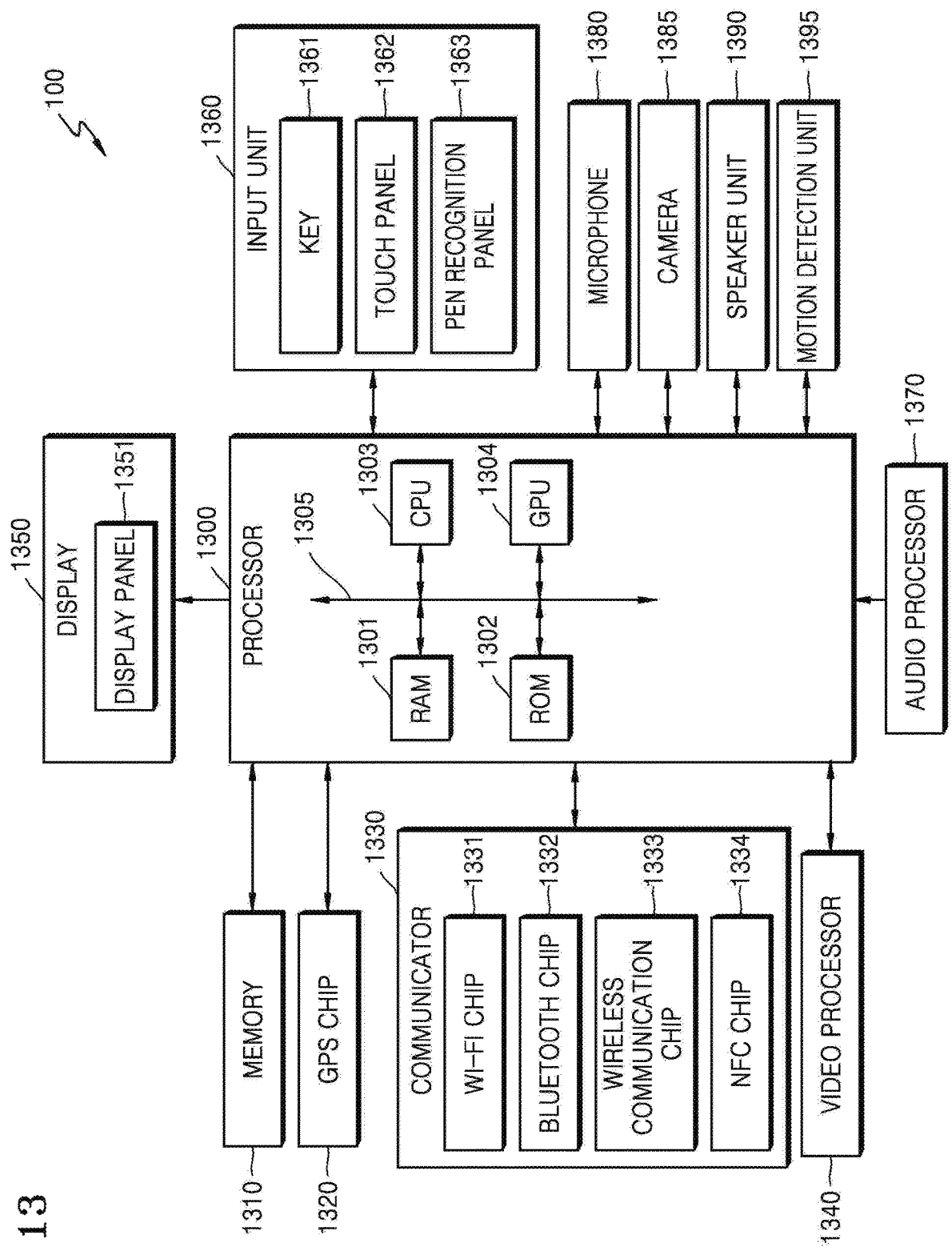
FIG. 13 is a block diagram of a configuration of the device according to various embodiments of the present disclosure.

FIG. 13 is a block diagram of a configuration of the device 100 according to various embodiments of the present disclosure.

Referring to FIG. 13, the device 100 may include at least one selected from the group consisting of a display 1350, a processor 1300, a memory 1310, a GPS chip 1320, a communicator 1330, a video processor 1340, an audio processor 1370, a user input unit 1360, a microphone 1380, a camera 1385, a speaker unit 1390, and a motion detection unit 1395.

The display 1350 may include a display panel 1351 and a processor (not shown) for controlling the display panel 1351. The display panel 1351 may be configured as various types of a display such as a liquid-crystal display (LCD), an organic light-emitting diode (OLED) display, an active-matrix OLED (AMOLED) display, or a plasma display panel (PDP). The display panel 1351 may be implemented to be flexible, transparent, or wearable. The display 1350 and a touch panel 1362 included in the user input unit 1360 may be combined with each other to constitute a touchscreen (not shown). For example, the touchscreen (not shown) may include a module formed as one body in which the display panel 1351 and the touch panel 1362 form a layered structure.

The memory 1310 may include at least one selected from the group consisting of an internal memory (not shown) and an external memory (not shown).

The internal memory may include, for example, at least one selected from the group consisting of a volatile memory (for example, a dynamic random access memory (DRAM), a static RAM (SRAM), a synchronous DRAM (SDRAM), or the like), a non-volatile memory (for example, a one-time programmable read-only memory (OTPROM), a PROM, an erasable and programmable ROM (EPROM), an electrically erasable and programmable ROM (EEPROM), a mask ROM, a flash ROM, or the like), a hard-disk drive (HDD), and a solid-state drive (SSD). According to an embodiment, the processor 1300 may load a command or data, received from at least one selected from the group consisting of the non-volatile memory and other elements, to the volatile memory and process the command or data. The processor 1300 may save data, received or generated from another element, in the non-volatile memory.

The external memory may include, for example, at least one selected from the group consisting of compact flash (CF), secure digital (SD), micro-SD, mini-SD, extreme digital (xD), and a memory stick.

The memory 1310 may store various programs and data used for operation of the device 100. For example, the memory 1310 may temporarily or non-permanently store at least a part of content that is to be displayed on a lock screen.

The processor 1300 may control the display 1350 to display a part of content stored in the memory 1310 on the display 1350. In other words, the processor 1300 may display a part of the content stored in the memory 1310 on the display 1350. Alternatively, if a user gesture is performed on an area of the display 1350, the processor 1300 may perform a control operation in correspondence with the user gesture.

The processor 1300 may include at least one selected from the group consisting of a RAM 1301, a ROM 1302, a central processing unit (CPU) 1303, a graphics processing unit (GPU) 1304, and a bus 1305. The RAM 1301, the ROM 1302, the CPU 1303, and the GPU 1304 may be connected to each other via the bus 1305.

The CPU 1303 accesses the memory 1310, and performs booting by using an operating system (OS) stored in the memory 1310. The CPU 1303 performs various operations by using various programs, content, or data stored in the memory 1310.

The ROM 1302 stores a command set for system booting. As an example, if a turn-on command is input and power is supplied to the device 100, the CPU 1303 may copy the OS stored in the memory 1310 to the RAM 1301 according to the command stored in the ROM 1302, and boot the system by executing the OS. When the booting is completed, the CPU 1303 copies various programs stored in the memory to the RAM 1301, and executes the programs copied to the RAM 1301 to perform various operations. When the booting of the device 100 is completed, the GPU 1304 displays a user interface (UI) screen on an area of the display 1350. In detail, the GPU 1304 may generate a screen on which an electronic document that includes various objects such as content, an icon, a menu, or the like is displayed. The GPU 1304 calculates attribute values such as a coordinate value, a shape, a size, or a color with respect to each object, according to a layout of the screen. Then, the GPU 1304 may generate a screen having various types of layout that includes an object, based on the calculated attribute value. The screen generated by the GPU 1304 may be provided to the display 1350, and displayed on each area of the display 1350.

The GPS chip 1320 may receive a GPS signal from a GPS satellite, and calculate a current location of the device 100. The processor 1300 may calculate a location of a user by using the GPS chip 1320, if a navigation program is used or a current location of the user is needed.

The communicator 1330 may perform communication with various types of external devices according to various types of communication methods. The communicator 1330 may include at least one selected from the group consisting of a Wi-Fi chip 1331, a Bluetooth chip 1332, a wireless communication chip 1333, and a near field communication (NFC) chip 1334. The processor 1300 may perform communication with various external devices by using the communicator 1330.

The Wi-Fi chip 1331 and the Bluetooth chip 1332 may respectively perform communication by using a Wi-Fi method and a Bluetooth method. If the Wi-Fi chip 1331 or the Bluetooth chip 1332 is employed, various connection information, such as a service set identifier (SSID), a session key, etc., is transceived in advance. Then, communication is performed by using the connection information so as to transceive various information. The wireless communication chip 1333 refers to a chip for performing communication according to various communication standards such as Institute of Electrical and Electronics Engineers (IEEE), ZigBee, $3^{rd}$ generation (3G), 3G partnership project (3GPP), or long-term evolution (LTE). The NFC chip 1334 refers to a chip that operates according to an NFC method by using 13.56 MHz, from among various radio frequency identification (MD) frequency bands such as 135 kHz, 13.56 MHz, 433 MHz, 860 to 960 MHz, 2.45 GHz, etc.

The video processor 1340 may process video data included in content received via the communicator 1330 or content stored in the memory 1310. The video processor 1340 may perform various image processing, such as decoding, scaling, noise filtering, a frame rate conversion, or a resolution conversion, on the video data.

The audio processor 1370 may process audio data included in content received via the communicator 1330, or content stored in the memory 1310. The audio processor 1370 may perform various processing, such as decoding, amplification, or noise filtering, on the audio data.

If a playback program of multimedia content is executed, the processor 1300 may play the multimedia content by driving the video processor 1340 and the audio processor 1370. The speaker unit 1390 may output audio data generated by the audio processor 1370.

The user input unit 1360 may receive an input of various commands from a user. The user input unit 1360 may include at least one selected from the group consisting of a key 1361, a touch panel 1362, and a pen recognition panel 1363.

The key 1361 may be various types of key such as a mechanical button or a wheel, which is formed on various areas such as at a front or a side of an outer surface of the device 100.

The touch panel 1362 may detect a touch input by a user and output a touch event value corresponding to a signal of the detected touch input. If the touch panel 1362 and the display panel 1351 are combined with each other to constitute a touchscreen (not shown), the touchscreen may be implemented by using various types of touch sensors such as a capacitive type, a resistive type, or a piezoelectric type. The capacitive touchscreen is formed by using a method of detecting micro-electricity generated from a body of a user when a part of the body of the user touches a surface of the touchscreen and calculating a coordinate of the touched location, by using a dielectric material coated on a surface of the touchscreen. The resistive touchscreen is formed by using a method of detecting current flowing when, if a user touches a touchscreen that includes two built-in electrode plates, an upper electrode plate and a lower electrode plate between the two built-in electrode plates contact each other at a touched location of the touchscreen, and calculating a coordinate of the touched location of the touchscreen. A touch event that occurs on the touchscreen may be generated mainly by a finger of a person, but may also be generated by a conductive material that may change electrostatic capacity.

A pen recognition panel 1363 may detect a proximity input or a touch input of a touch pen used by a user (for example, a stylus pen or a digitizer pen), and output an event of the detected proximity input or the detected touch input of the touch pen. The pen recognition panel 1363 may be implemented by using an electromagnetic resonance (EMR) method and detect a touch input or a proximity input according to a change in strength of an electromagnetic field as the touch pen is near or touches the pen recognition panel. In detail, the pen recognition panel 1363 may include an electromagnetic induction coil sensor (not shown) having a grid structure and an electric signal processor (not shown) providing an alternating current (AC) signal having a predetermined frequency sequentially to each loop coil of the electromagnetic induction coil sensor. If a pen having a resonant circuit is placed in a vicinity of a loop coil of the pen recognition panel 1363, a magnetic field transmitted from the loop coil generates current based on mutual electromagnetic induction through the resonant circuit of the pen. Based on the current, an induction field may be generated from the coil of the resonant circuit in the pen, and the pen recognition panel 1363 may detect the induction field in a loop coil that is in a signal reception state, thereby sensing a proximity location or a touch location of the pen. The pen recognition panel 1363 may be located below the display panel 1351 to have a certain area, for example, an area that may cover a display area of the display panel 1351.

The microphone 1380 may receive an input of user voice or other sound and convert the user voice or the other sound into audio data. The processor 1300 may use user voice, input via the microphone 1380, for a phone call operation, or convert the user voice into audio data and store the user voice in the memory 1310.

The camera 1385 may capture a still image or a moving image according to control by a user. A plurality of the cameras 1385 such as a front camera and a rear camera may be included.

If the camera 1385 and the microphone 1380 are provided, the processor 1300 may perform control operation according to user voice input via the microphone 1380 or a gesture of a user recognized by the camera 1385. For example, the device 100 may operate in a motion control mode or a voice control mode. If the device 100 operates in the motion control mode, the processor 1300 may activate the camera 1385 to capture an image of the user, track a change in the motion of the user, and then, perform control operation corresponding to the change in the motion of the user. If the device 100 operates in the voice control mode, the processor 1300 may operate in a voice recognition mode in which user voice input via the microphone 1380 is analyzed, and a control operation is performed according to the analyzed user voice.

The motion detection unit 1395 may detect movement of a main body of the device 100. The device 100 may be rotated or tilted in various direction. The motion detection unit 1395 may detect movement characteristics such as a rotation direction, an angle, or an inclination by using at least one selected from the group consisting of various sensors such as a geo-magnetic sensor, a gyroscope sensor, and an acceleration sensor.

Additionally, although not shown in FIG. 13, according to various embodiments, the device 100 may further include a universal serial bus (USB) port to which a USB connector may be connected, various external input ports for connecting to various external terminals for a headset, a mouse, or a local area network (LAN), a digital multimedia broadcasting (DMB) chip for receiving and processing a DMB signal, or various sensors.

Elements of the device 100 may be named differently. Additionally, according to an embodiment, the device 100 may include at least one selected from the group consisting of above-described elements. It may be further understood that some elements may not be included, or additional elements may be further included.

Figure 14:
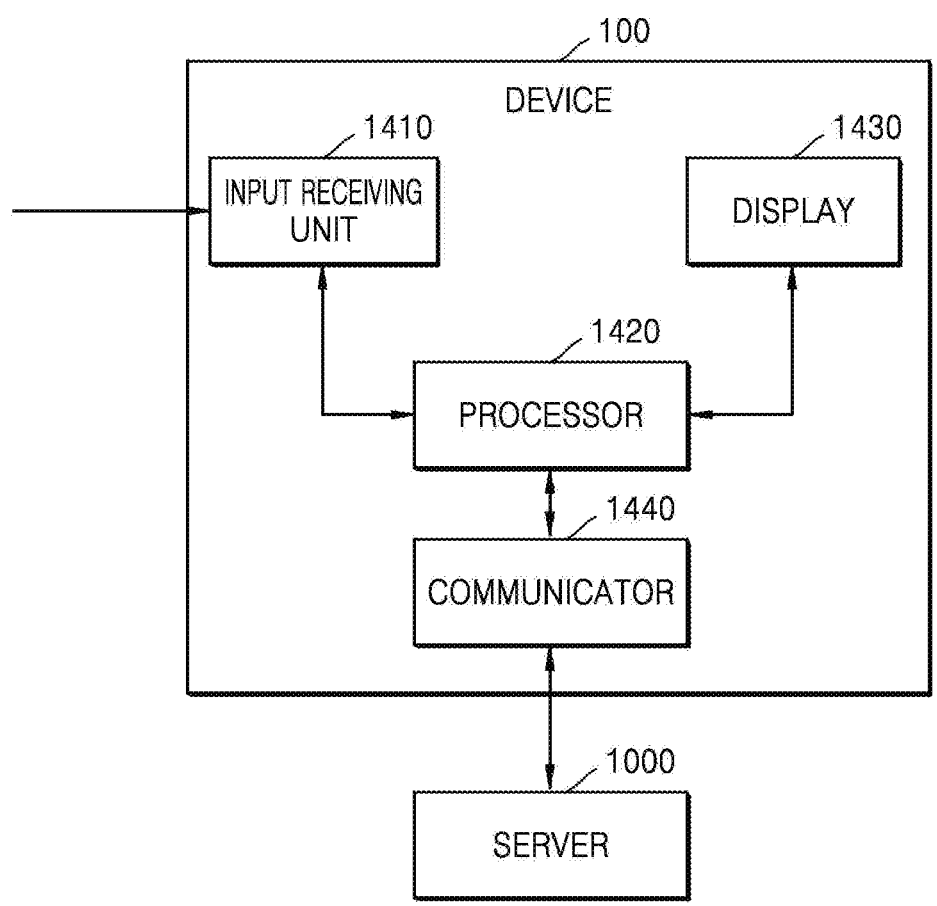
FIG. 14 is a block diagram of a configuration of the device according to various embodiments of the present disclosure.

FIG. 14 is a block diagram of a configuration of the device 100 according to various embodiments of the present disclosure.

Referring to FIG. 14, according to an embodiment, the device 100 may include an input receiving unit 1410, a processor 1420, a display 1430, and a communicator 1440.

However, it may be further understood that some elements may not be included, or additional elements may be further included.

Additionally, according to an embodiment, the device 100 may work with the server 1000.

Hereinafter, a description about the elements described above is provided.

The touch panel 1362, the microphone 1380, the camera 1385, and the motion detection unit 1395, shown in FIG. 13, may be included in the input receiving unit 1410 in the device 100. The processor 1300 shown in FIG. 13 may be included in the processor 1420 in the device 100. The display 1350 shown in FIG. 13 may be included in the display 1430 in the device 100. The communicator 1330 shown in FIG. 13 may be included in the communicator 1440 in the device 100.

The input receiving unit 1410 may receive a user input. A user input may refer to an input received from a user. For example, a user input may include at least one selected from the group consisting of a touch input, a keyboard input, a sound input, a button input, and a gesture input.

According to an embodiment, the input receiving unit 1410 may receive a user input by using a sensor included in the device 100. For example, the input receiving unit 1410 may receive a voice input from a user by using a microphone included in the device 100. As another example, the input receiving unit 1410 may receive a gesture input from a user by using an acceleration sensor included in the device 100. For example, if a user shakes the device 100 in upward and downward directions a certain number of times, the device 100 may receive a gesture input corresponding to the device 100 being shaken in the upward and downward directions the number of times.

According to an embodiment, the input receiving unit 1410 may receive a user input for evaluation of displayed text and a displayed image.

According to an embodiment, the display 1430 may display a screen for receiving a user input for evaluation. For example, the device 100 may display text and an image, and then, display a screen for receiving an input of a degree of satisfaction about the displayed text and the displayed image.

For example, the display 1430 may display a screen for receiving an input for evaluation of the displayed text and the displayed image in the form of a score ranging from 0 to 100.

As another example, the display 1430 may respectively display a first screen for receiving an input for evaluation of displayed text and a second screen for receiving an input for evaluation of a displayed image. According to an embodiment, the display 1430 may display the first screen and the second screen at a same time. According to an embodiment, the display 1430 may display the first screen before the second screen is displayed and, after receiving of an input for evaluation of the displayed text is completed, display the second screen.

According to an embodiment, the first screen and the second screen may display one or more items. For example, the first screen may display at least one selected from the group consisting of an item for receiving an input for evaluation of whether content of the displayed text is appropriate, an item for receiving an input of a response intended by the user if the displayed text is not shown as intended by the user, and an item for requesting a change in a form of displayed text (for example, a font). As another example, the second screen may display at least one selected from the group consisting of an item for receiving an input for evaluation of whether the displayed image is appropriate, an item for selecting an image that the user wants if the user wants to change the displayed image, and an item for requesting a change in a form of the displayed image (for example, a size or a color of the image).

The processor 1420 may obtain an inquiry that a received user input indicates. For example, the processor 1420 may obtain a request for certain information from a voice input received from the user. According to an embodiment, an inquiry may be expressed in an interrogative sentence.

According to an embodiment, if the input receiving unit 1410 receives a voice input saying, "What is the schedule for today?" from a user, the processor 1420 may obtain an inquiry requesting information about the user's schedule for today, and obtain information about the user's schedule for today in correspondence with the obtained inquiry.

According to an embodiment, if the input receiving unit 1410 receives a first button input from the user, the processor 1420 may obtain an inquiry corresponding to the first button input.

According to an embodiment, if the input receiving unit 1410 consecutively receives a first button input and a second button input from the user, the processor 1420 may obtain an inquiry corresponding to the first button input and the second button input which are consecutively received.

According to an embodiment, if the input receiving unit 1410 receives a first touch input from the user, the processor 1420 may obtain an inquiry corresponding to the first touch input.

According to an embodiment, if the input receiving unit 1410 receives a first touch input and a second touch input from the user within a certain interval of time, the processor 1420 may obtain an inquiry corresponding to the first touch input and the second touch input which are consecutively received.

According to an embodiment, if the input receiving unit 1410 receives a first gesture input from the user, the processor 1420 may obtain an inquiry corresponding to the first gesture input. For example, if the input receiving unit 1410 receives a gesture input corresponding to the device 100 being shaken in the upward and downward directions three times, the processor 1420 may obtain an inquiry asking, "What is the schedule for today?".

According to an embodiment, the input receiving unit 1410 may obtain context information indicating context of the user.

According to an embodiment, the input receiving unit 1410 may obtain context information by using a sensor included in the input receiving unit 1410. For example, the input receiving unit 1410 may obtain location information about the device 100 by using a location detection sensor included in the input receiving unit 1410. As another example, the input receiving unit 1410 may obtain temperature information, time information, or noise information by using a sensor included in the input receiving unit 1410.

According to an embodiment, the device 100 may obtain context information from the server 1000. For example, the device 100 may obtain time information, map information, weather information, news information, or the like from the server 1000.

The processor 1420 may obtain a response corresponding to an inquiry by using context information.

According to an embodiment, the processor 1420 may obtain a response based on an inquiry and context information.

For example, if the processor 1420 obtains an inquiry asking, "How is the weather today?", the processor 1420 may obtain weather information about a region corresponding to a current location of the device 100. As another example, if the processor 1420 obtains an inquiry asking, "What is the schedule?", the processor 1420 may obtain information about a schedule planned for a period of time of one hour from present time. As another example, if the processor 1420 obtains an inquiry asking about "real-time search words", the processor 1420 may obtain information about real-time search words ranked $1^{st}$ through $10^{th}$ in a certain search engine at the present time. As another example, if the processor 1420 obtains an inquiry asking about "a route to Dongdaemun", the processor 1420 may obtain information about a route from a current location of the device 100 to Dongdaemun in consideration of current traffic volume. As another example, if the processor 1420 obtains an inquiry asking, "What clothes are recommended to be worn today?", the processor 1420 may obtain information about clothes that are to be recommended to be worn by the user today based on today's weather forecast.

According to an embodiment, the processor 1420 may select a response corresponding to context information, from among a plurality of responses corresponding to the inquiry.

For example, if the processor 1420 obtains an inquiry asking, "How is the weather today?", the processor 1420 may obtain weather information about a region corresponding to a current location of the device 100, from among weather information about a plurality of regions. As another example, if the processor 1420 obtains an inquiry asking, "What is the schedule?", the processor 1420 may obtain information about a schedule planned for a nearest future from the present time, from among the user's schedules for today. As another example, if the processor 1420 obtains an inquiry asking about "real-time search words", the processor 1420 may obtain information about real-time search words ranked $1^{st}$ through $10^{th}$ in a search engine that has been most frequently accessed, from among a plurality of search engines. As another example, if the processor 1420 obtains an inquiry asking about "a route to Dongdaemun", the processor 1420 may obtain information about a route from among a plurality of routes from a current location of the device 100 to Dongdaemun Gate, in consideration of current traffic volume. As another example, if the processor 1420 obtains an inquiry asking, "What clothes are recommended to be worn today?", the processor 1420 may obtain information about clothes that are to be recommended to be worn by the user today from among information about a plurality of pieces of clothes stored in the device 100, based on today's weather forecast.

According to an embodiment, the processor 1420 may obtain a response that is different from an obtained response, by using a received user input and context information. According to an embodiment, the processor 1420 may use the user input that the input receiving unit 1410 received when the processor 1420 obtained a response corresponding to an inquiry. The user input received by the input receiving unit 1410 may refer to a user input for evaluation.

For example, after the processor 1420 obtains a first response, the processor 1420 may obtain a second response, by using a user input received by the input receiving unit 1410. For example, with respect to an inquiry asking, "How is the weather today?", the processor 1420 may obtain information about weather for today, and then, obtain information about weather for tomorrow according to a user input for evaluation which requests the weather for tomorrow. As another example, with respect to an inquiry asking, "What is the schedule?", the processor 1420 may obtain information about a schedule planned for a period of time of two hours from present time, and then, obtain information about a schedule planned for a period of time of one hour from the present time according to a received user input for evaluation which requests the schedule planned for one hour from the present time.

According to an embodiment, the processor 1420 may change a displayed image of a subject based on a received user input. For example, the processor 1420 may change a displayed image of a subject based on a history of a received user input.

According to an embodiment, the processor 1420 may change a displayed image of a subject based on a received user input. For example, if the processor 1420 displays a first character image as an image of a subject, the processor 1420 may change the displayed image of the subject into a second character image according to a user input requesting to display the second character image as the image of the subject.

According to an embodiment, the processor 1420 may change a displayed image of a subject based on a history of a received user input.

According to an embodiment, if the processor 1420 receives a user input for evaluation of displayed text and a displayed image a certain number of times or more, the device 100 may change the displayed image of the subject from the first character image to the second character image. For example, a displayed image of a subject may be changed according to certain criteria, based on the number of times the user input for the evaluation is received.

For example, if the user input for the evaluation is received 0 to 10 times, the processor 1420 may select a character image of a child as a displayed image of a subject. As another example, if the user input for the evaluation is received 11 times to 20 times, the processor 1420 may select a character image of a teenager as a displayed image of the subject. As another example, if the user input for the evaluation is received 21 times to 30 times, the processor 1420 may select a character image of a person in his/her 30s as a displayed image of the subject. As another example, if the user input for the evaluation is received 31 times or more, the processor 1420 may select a character image of an elderly person as a displayed image of the subject.

As another example, if the user input for the evaluation is received 0 times to 10 times, the processor 1420 may select a character image of a monkey as a displayed image of the subject. As another example, if the user input for the evaluation is received 11 times to 20 times, the processor 1420 may select a character image of Australopithecus as a displayed image of the subject. As another example, if the user input for the evaluation is received 21 times to 30 times, the processor 1420 may select a character image of Homo sapiens as a displayed image of the subject. As another example, if the user input for the evaluation is received 31 times or more, the processor 1420 may select a character image of a modern human as a displayed image of the subject.

As another example, if an average evaluation score that the device 100 obtains from evaluations of the displayed text and image according to the user input is equal to or greater than certain criteria, the processor 1420 may change a displayed image of the subject from the first character image to the second character image.

For example, an average evaluation score obtained according to the user input for evaluation ranges from 0 to 25, the processor 1420 may select a character image of a child as a displayed image of the subject. As another example, an average evaluation score obtained according to the user input for evaluation ranges from 26 to 50, the processor 1420 may select a character image of a teenager as a displayed image of the subject. As another example, if an average evaluation score obtained according to the user input for evaluation ranges from 51 to 75, the processor 1420 may select a character image of a person in his/her 30s as a displayed image of the subject. As another example, an average evaluation score obtained according to the user input for evaluation ranges from 76 to 100, the processor 1420 may select a character image of an elderly person as a displayed image of the subject.

The display 1430 may display text indicating an obtained response and an image of a subject providing the response.

According to an embodiment, the processor 1420 may obtain text indicating the response, and the display 1430 may display the obtained text. For example, the display 1430 may display a sentence indicating the obtained response.

For example, if the obtained response is information about a schedule planned for a period of time of one hour from present time, the processor 1420 may generate the text 120 indicating information about the schedule planned for the period of time one hour from the present time. As another example, if the obtained response is information about weather for today, the device 100 may generate text indicating "sunny weather with a highest temperature of 7° C. and a lowest temperature of 2° C. is expected today".

According to an embodiment, text indicating a response may be expressed in one or more words. For example, text indicating a response may be expressed in a sentence. As another example, text indicating a response may be expressed by using a plurality of nouns.

For example, if the obtained response is real-time search words ranked 1$^{st}$ through 10$^{th}$, the display 1430 may display the real-time search words ranked 1$^{st}$ through 10$^{th}$ in a text form.

According to an embodiment, text may be displayed in the form of a speech balloon.

According to an embodiment, the display 1430 may display an image of a subject providing a response.

For example, the display 1430 may display the image 110 of a subject providing text indicating a response. According to an embodiment, text may be displayed in the form of a speech balloon. Additionally, according to an embodiment, the display 1430 may display an image of a subject providing text in the form of a speech balloon.

According to an embodiment, the processor 1420 may determine an image of a subject providing a response, from among a plurality of images. For example, the processor 1420 may determine an image of a subject providing a response, from among a plurality of images, by using context information.

According to an embodiment, an image of a subject providing a response may be a character image. According to an embodiment, an image of a subject providing a response may be an image of a personified subject.

According to an embodiment, the communicator 1440 may be employed to transceive data with outside of the device 100. For example, if the device 100 works with the server 1000, the communicator 1440 may transceive data between the device 100 and the server 1000.

Figure 15:
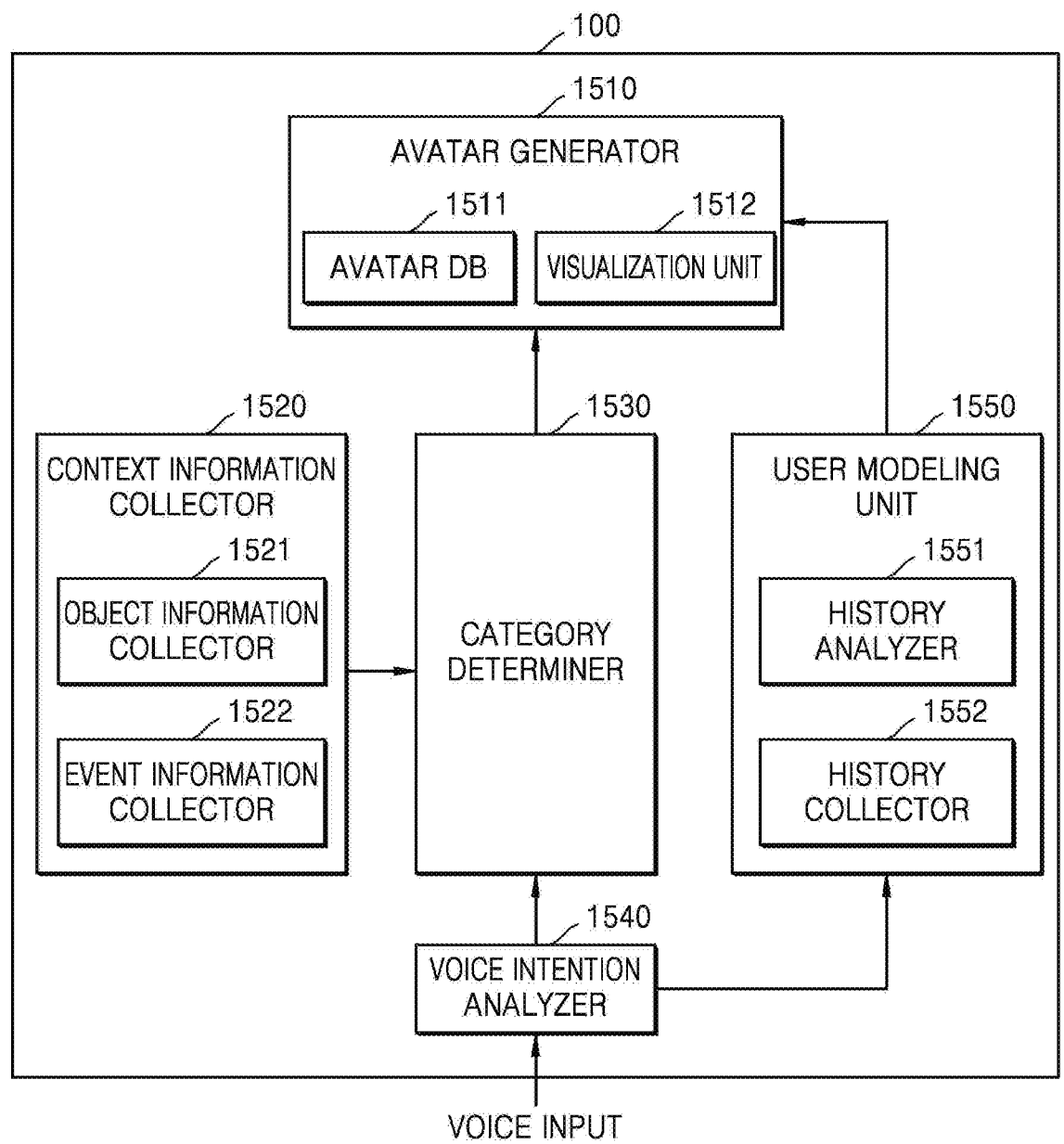
FIG. 15 is a block diagram of a configuration of the device according to various embodiments of the present disclosure.

FIG. 15 is a block diagram of a configuration of the device 100 according to various embodiments of the present disclosure.

Referring to FIG. 15, according to various embodiments, the device 100 may include an avatar generator 1510, a context information collector 1520, a category determiner 1530, a voice intention analyzer 1540, and a user modeling unit 1550.

However, the device 100 may be implemented by using more or less elements than those shown in FIG. 15.

Hereinafter, a description about the elements described above is provided.

According to an embodiment, the avatar generator 1510 may generate an avatar that is used to display a response. For example, the avatar generator 1510 may generate an image of a subject providing text indicating a response.

According to an embodiment, the avatar generator 1510 may include an avatar database (DB) 1511 and a visualization unit 1512. The avatar DB 1511 may include information about a plurality of avatars. The visualization unit 1512 may generate information needed to display an avatar, from among a plurality of avatars stored in the avatar DB 1511, on a screen of the device 100.

According to an embodiment, the avatar generator 1510 may obtain information about a category determined by the category determiner 1530. For example, the category determiner 1530 may identify a response category corresponding to a determined response, from among a plurality of response categories, and transmit information about the identified response category to the avatar generator 1510. Additionally, the avatar generator 1510 may generate an avatar corresponding to the identified response category.

According to an embodiment, the avatar generator 1510 may obtain user modeling information from the user modeling unit 1550. For example, the user modeling unit 1550 may determine a user model corresponding to a determined response, from among a plurality of user models, and transmit information about the determined user model to the avatar generator 1510. Additionally, the avatar generator 1510 may generate an avatar corresponding to the determined response category.

A method of displaying an image of a subject providing a response is described with reference to operation S250.

According to an embodiment, the context information collector 1520 may obtain context information. For example, the context information collector 1520 may include an object information collector 1521 and an event information collector 1522.

According to an embodiment, the object information collector 1521 may obtain information about objects in a periphery of the device 100. For example, the object information collector 1521 may obtain information indicating that an object in a periphery of the device 100 is a dressing table.

According to an embodiment, the event information collector 1522 may obtain context information about a user. For example, the event information collector 1522 may obtain information about a skin state of a user from the dressing table that is an object in a periphery of the device 100.

The context information collector 1520 may transmit the obtained context information to the category determiner 1530.

A method of obtaining context information was described in detail with reference to operation S230.

According to an embodiment, the category determiner 1530 may identify a response category corresponding to a determined response, from among a plurality of response categories, and transmit information about the identified response category to the avatar generator 1510.

For example, the category determiner 1530 may determine a response category from among a plurality of response categories, by using information received from the voice intention analyzer 1540 and the context information collector 1520. A response category may refer to a category to which a determined response belongs.

For example, if current context indicates that it is raining now and an inquiry obtained by the voice intention analyzer 1540 is, "What is a menu for today?", information about a category "a rainy day" and information about a category "cook" may be transmitted to the avatar generator 1510 as a response category. In this case, according to an embodiment, the avatar generator 1510 may generate an avatar of a cook who is using an umbrella.

A method of identifying a category and selecting an avatar is described with reference to FIG. 6.

According to an embodiment, the voice intention analyzer 1540 may obtain an inquiry indicated by a received voice input. A method of obtaining an inquiry indicated by a voice input is described with reference to operation S220.

According to an embodiment, the user modeling unit 1550 may determine a user model from among a plurality of user models.

According to an embodiment, the user modeling unit 1550 may include a history analyzer 1551 and a history collector 1552.

According to an embodiment, the history collector 1552 may obtain a history of an inquiry of a user from information received from the voice intention analyzer 1540. Additionally, the history collector 1552 may obtain a history of a user input for evaluation.

According to an embodiment, the history analyzer 1551 may analyze a history obtained by the history collector 1552. The history analyzer 1551 may determine a user model from among a plurality of user models, based on the history obtained by the history collector 1552.

A user model may refer to a model indicating a user. For example, a user model may be a 12-year-old boy, a worker in his/her 30s, or a professor in his/her 50s.

A user modeling unit may transmit information about a determined user model to the avatar generator 1510.

Various embodiments can be embodied in the form of a non-transitory computer-readable recording medium containing commands implementable by a computer such as a program module executed by a computer. The non-transitory computer-readable recording medium may be any available medium accessible by a computer and includes any of volatile and non-volatile media and separable and non-separable media. Furthermore, the non-transitory computer readable recording medium may include a computer storage medium and a communication medium. The computer storage medium includes any of the volatile and non-volatile media and separable and non-separable media embodied by any method or technology for storing information such as a computer-readable command, a data structure, a program module or other data. The communication medium includes a computer readable command, a data structure, a program module or other data of a modulated data signal such as carrier wave, or other transmission mechanisms, and includes any information transmission medium.

It should be understood that embodiments described herein should be considered in a descriptive sense only and not for purposes of limitation. Descriptions of features or aspects within each embodiment should typically be considered as available for other similar features or aspects in other embodiments. For example, each component described in singular form may be executed in a distributed form. Likewise, components described in a distributed form may be executed in a combined form.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method performed by an electronic device, the method comprising:
   receiving an inquiry based on a user input;
   obtaining information indicating a type of peripheral apparatus located within a predetermined distance from the electronic device among a plurality of different types of peripheral apparatuses;
   obtaining context information indicating context of a user;
   determining a first response, from among a plurality of responses corresponding to the inquiry, based on the obtained information indicating the type of peripheral apparatus and the obtained context information;
   determining an avatar image from among a plurality of avatar images, based on the determined first response; and
   displaying in response to the inquiry:
   a text indicating the determined first response, and
   the determined avatar image.

2. The method of claim 1, further comprising:
   receiving a user input for evaluation of the displayed text and the displayed avatar image.

3. The method of claim 2, further comprising:
   evaluating the user input; and
   determining a second response that is different from the determined first response, from among the plurality of responses, based on the evaluation and the context information.

4. The method of claim 2, further comprising:
   changing the displayed avatar image of a subject, based on a history of the received user input for the evaluation.

5. The method of claim 1, further comprising:
   identifying a response category corresponding to the determined response, from among a plurality of response categories;
   selecting an avatar image from among a plurality of avatar images according to the identified response category; and
   displaying an image of a subject as the selected avatar image.

6. The method of claim 1, further comprising:
   obtaining user information about the user;
   selecting the avatar image from among a plurality of avatar images based on the user information; and
   displaying an image of a subject as the selected avatar image.

7. The method of claim 1, wherein the determining of the response comprises:
   obtaining a plurality of responses corresponding to the inquiry;
   obtaining the context information by using one or more sensors included in the device; and
   determining the first response from among the plurality of responses by using the context information.

8. The method of claim 1, wherein the determining of the first response comprises:
   obtaining schedule information about the user;
   determining a schedule from among a plurality of schedules included in the schedule information by using the context information; and
   generating text indicating the response based on the determined schedule.

9. A non-transitory computer-readable recording medium having recorded thereon a computer program which, when executed by a processor, causes the processor to control to perform the method of claim 1.

10. An electronic device comprising:
    a display; and
    a processor configured to:
      receive an inquiry based on a user input,
      obtain information indicating a type of peripheral apparatus located within a predetermined distance from the electronic device among a plurality of different types of peripheral apparatuses,
      obtain context information indicating context of the user input,
      determine a first response, from among a plurality of responses corresponding to the inquiry, based on the obtained information indicating the type of peripheral apparatus and the obtained context information,
      determine an avatar image from among a plurality of avatar images, based on the determined first response, and
      control the display to display in response to the inquiry: a text indicating the determined first response, and the determined avatar image.

11. The electronic device of claim 10, further comprising:
    an input receiving unit configured to receive a user input for evaluation of the displayed text and the displayed avatar image.

12. The electronic device of claim 11, wherein the processor is further configured to:
    evaluate the user input; and
    determine a second response that is different from the determined first response, from among the plurality of responses, based on the evaluation and the context information.

13. The electronic device of claim 10, wherein the processor is further configured to change the displayed avatar image of a subject, based on a history of the received user input for an evaluation.

14. The electronic device of claim 10,
    wherein the processor is further configured to:
      identify a response category corresponding to the determined response, from among a plurality of response categories;
      select an avatar image from among a plurality of avatar images according to the identified response category; and
      display an image of a subject as the selected avatar image.

15. The electronic device of claim 10,
    wherein the processor is further configured to:
      obtain user information about the user, and
      select the avatar image from among a plurality of avatar images based on the user information, and
    wherein the displayed image of a subject is the selected avatar image.

16. The electronic device of claim 10, wherein the processor is further configured to:
    obtain a plurality of responses corresponding to the inquiry;
    obtain the context information by using one or more sensors included in the device; and
    determine the first response from among the plurality of responses by using the context information.

17. The electronic device of claim 10, wherein the processor is further configured to:
    obtain schedule information about the user;
    determine a schedule from among a plurality of schedules included in the schedule information by using the context information; and
    generate text indicating the response based on the determined schedule.

* * * * *